(12) United States Patent
Arita et al.

(10) Patent No.: US 8,488,146 B2
(45) Date of Patent: Jul. 16, 2013

(54) IMAGE FORMING SYSTEM, GROUPWARE SERVER, IMAGE FORMING APPARATUS AND COMPUTER-READABLE STORAGE MEDIUM

(75) Inventors: Junko Arita, Tokyo (JP); Takeshi Hasebe, Chiba (JP); Ryuuichi Kiyama, Kanagawa (JP); Sanae Endoh, Tokyo (JP); Hiroaki Kawade, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 1393 days.

(21) Appl. No.: 11/742,795

(22) Filed: May 1, 2007

(65) Prior Publication Data

US 2008/0109457 A1 May 8, 2008

(30) Foreign Application Priority Data

May 12, 2006 (JP) ................................. 2006-134158
Oct. 18, 2006 (JP) ................................. 2006-284315

(51) Int. Cl.
*G06F 3/12* (2006.01)
(52) U.S. Cl.
USPC ........... 358/1.15; 358/1.1; 358/1.9; 358/1.13; 358/1.16; 709/201; 709/203; 709/204; 709/205; 709/206; 709/213; 707/740
(58) Field of Classification Search
None
See application file for complete search history.

(56) References Cited

U.S. PATENT DOCUMENTS

| | | | |
|---|---|---|---|
| 2002/0044299 A1* | 4/2002 | Iwase et al. | ............... 358/1.15 |
| 2003/0076531 A1 | 4/2003 | Kawasumi et al. | |
| 2003/0233437 A1 | 12/2003 | Kitada et al. | |
| 2004/0024811 A1 | 2/2004 | Kitada et al. | |
| 2004/0044958 A1* | 3/2004 | Wolf et al. | ..................... 715/513 |
| 2004/0070613 A1* | 4/2004 | Sprague et al. | ............... 345/762 |
| 2005/0198559 A1* | 9/2005 | Fujiwara | ....................... 715/500 |
| 2005/0234859 A1* | 10/2005 | Ebata | ................................ 707/1 |

(Continued)

FOREIGN PATENT DOCUMENTS

| | | |
|---|---|---|
| JP | 11-203314 | 7/1999 |
| JP | 2000-322425 | 11/2000 |

(Continued)

OTHER PUBLICATIONS

Ricoh Corporation, "Scanning Solution for Livelink", [Online] http://www.ricoh-usa.com/products/solutions/pdf/globalscan/Livelink.pdf>, XP 002454961, 2005, 2 Pages.*

(Continued)

*Primary Examiner* — Miya J Cato
(74) *Attorney, Agent, or Firm* — Oblon, Spivak, McClelland, Maier & Neustadt, L.L.P.

(57) ABSTRACT

An image forming system has an image forming apparatus configured to function as a groupware terminal, and a groupware server of a groupware having a document database configured to store document data and attribute information corresponding to the document data, and an attribute database configured to store the attribute information. The image forming apparatus has a scan part configured to scan a paper document and to obtain document data, a setting part configured to set a certain attribute information of the document data obtained by the scan part, by referring to the attribute information stored in the attribute database, and a sending part configured to send to the groupware server the document data having the set attribute information. The groupware server stores the document data having the set attribute information, received from the sending part, in the document database.

24 Claims, 17 Drawing Sheets

U.S. PATENT DOCUMENTS

| | | | |
|---|---|---|---|
| 2006/0059462 A1* | 3/2006 | Yamamoto | 717/115 |
| 2007/0076240 A1* | 4/2007 | Ogura | 358/1.14 |
| 2007/0133033 A1* | 6/2007 | Mizutani et al. | 358/1.14 |

FOREIGN PATENT DOCUMENTS

| | | |
|---|---|---|
| JP | 2005-208977 | 8/2005 |
| JP | 2005-316952 | 11/2005 |
| JP | 2005-352782 | 12/2005 |

OTHER PUBLICATIONS

U.S. Appl. No. 11/869,320, filed Oct. 9, 2007, Arita, et al.

Ricoh Corporation, "Scanning Solution for Livelink", [Online] http://www.ricoh-usa.com/products/solutions/pdf/globalscan/Livelink.pdf>, XP 002454962, 2005, 2 Pages.

Ricoh Corporation, "Scanning Solution for Filenet", [Online] http://www.ricoh-usa.com/products/solutions/pdf/globalscan/Filenet.pdf>, XP 002454961, 2005, 4 Pages.

Office Action issued Mar. 29, 2011, in Japan Patent Application No. 2006-134158.

Office Action issued Jun. 21, 2011, in Japan Patent Application No. 2006-284315.

Office Action issued Jun. 28, 2011, in Japanese Patent Application No. 2006-134158.

\* cited by examiner

FIG.9

MANUAL (DOCUMENT MANAGEMENT) DATABASE   ●NEW DOCUMENT

DOCUMENT INFO INPUT — 306

| Field | Value |
|---|---|
| FILE NAME | specification_%last 2 digits of year month day%-%hour minute second% |
| DOCUMENT NAME | insert document name here |
| DOCUMENT CLASSIFICATION 1 | 1. quality document |
| DOCUMENT CLASSIFICATION 2 | 01. organization function |
| DOCUMENT CLASSIFICATION 3 | 01-1. organization function diagram |
| DOCUMENT DISTRIBUTION DESTINATION | Mr. ○○ |
| INSPECTOR 1 | Mr. ×× |
| INSPECTOR 2 | Mr. △△ |
| INSPECTOR 3 | |
| SEARCH KEYWORD | specification |

FIG.17

MANUAL (DOCUMENT MANAGEMENT) ● EXISTING DOCUMENT
DATABASE

DOCUMENT INFO INPUT —306

| FILE NAME | specification_%last 2 digits of year_month_day%-%hour_minute_second% |
| DOCUMENT NAME | technical document |
| DOCUMENT CLASSIFICATION 1 | 1. quality document |
| DOCUMENT CLASSIFICATION 2 | 01. organization function |
| DOCUMENT CLASSIFICATION 3 | 01-1. organization function diagram |
| DOCUMENT DISTRIBUTION DESTINATION | Mr. OO |
| INSPECTOR 1 | Mr. XX |
| INSPECTOR 2 | Mr. △△ |
| INSPECTOR 3 | |
| SEARCH KEYWORD | specification |

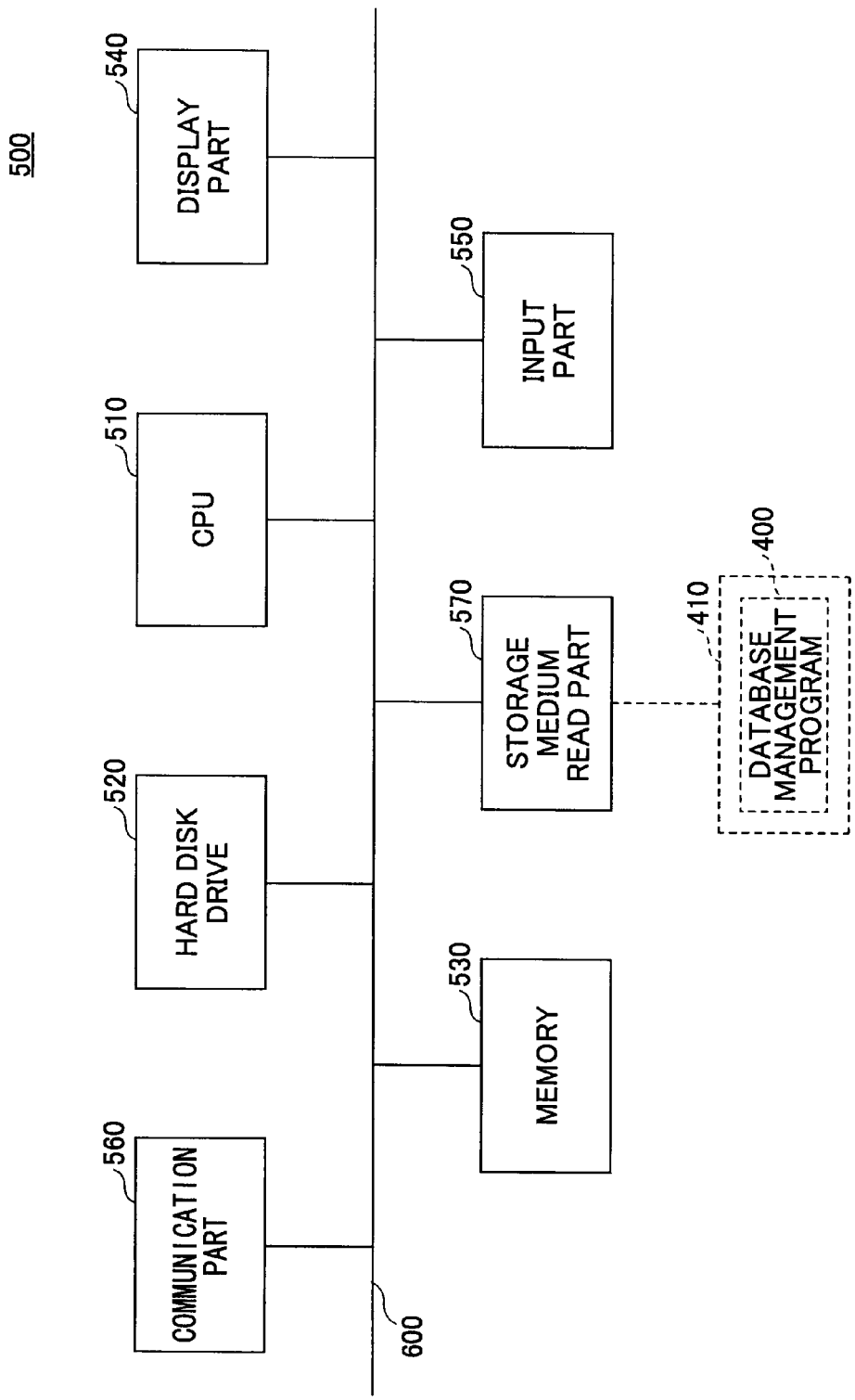

IMAGE FORMING SYSTEM, GROUPWARE SERVER, IMAGE FORMING APPARATUS AND COMPUTER-READABLE STORAGE MEDIUM

BACKGROUND OF THE INVENTION

1. Field of the Invention

The present invention generally relates to image forming systems, groupware servers, image forming apparatuses and computer-readable storage media, and more particularly to an image forming system that uses a groupware, a groupware server that provides such a groupware, and an image forming apparatus and a computer-readable storage medium that use such a groupware.

2. Description of the Related Art

Recently, paper documents are formed into electronic document data in various fields of business. For example, according to a conventional groupware, when forming the paper document into the electronic document data and storing the electronic document data in a groupware server, the user first scans the paper document by an image forming apparatus or a scanner having a scan function so as to obtain the electronic document data. Then, the electronic document data is once stored in a computer or a file server of the user, so as to carry out a preparation process such a renaming the electronic document data. Thereafter, it is necessary to carry out a process of storing the electronic document data that has been subjected to the preparation process in a predetermined region of the groupware server. In addition, in order to enable searching of the electronic document data that is stored in the groupware server by use of a search keyword, the search keyword must be stored in the groupware server after storing the electronic document data in the groupware server.

Therefore, there conventionally were problems in that a complex and troublesome operations are required to form the paper document into the electronic document data, and that it is difficult to quickly obtain the electronic document data.

SUMMARY OF THE INVENTION

Accordingly, it is a general object of the present invention to provide a novel and useful image forming system, groupware server, image forming apparatus and computer-readable storage medium, in which the problems described above are suppressed.

Another and more specific object of the present invention is to provide an image forming system, a groupware server, an image forming apparatus and a computer-readable storage medium, which can simplify the operation of forming the paper document into the electronic document data.

Still another object of the present invention is to provide an image forming system comprising an image forming apparatus configured to function as a groupware terminal; and a groupware server of a groupware, comprising at least one document database configured to store document data and attribute information corresponding to the document data, and an attribute database configured to store the attribute information, the image forming apparatus comprising a scan part configured to scan a paper document and to obtain document data; a setting part configured to set a certain attribute information of the document data obtained by the scan part, by referring to the attribute information stored in the attribute database; and a sending part configured to send to the groupware server the document data having the set attribute information, the groupware server storing the document data having the set attribute information, received from the sending part, in the document database. According to the image forming system of the present invention, it is possible to simplify the operation of forming the paper document into the electronic document data.

A further object of the present invention is to provide a groupware server of a groupware which is connectable, via a network, to an image forming apparatus that functions as a groupware terminal, the groupware server comprising a communicating part configured to communicate with the image forming apparatus via the network; at least one document database configured to store document data and attribute information corresponding to the document data; an attribute database configured to store the attribute information; and a write part configured to write the document data and the attribute information to the at least one document database, wherein the communicating part sends certain attribute information to the image forming apparatus in response to an acquisition request for the certain attribute information received from the image forming apparatus, and the write part writes the document data in the at least one document database in response to a write request for the document data having the certain attribute information, received by the communicating part from the image forming apparatus. According to the groupware server of the present invention, it is possible to simplify the operation of forming the paper document into the electronic document data.

Another object of the present invention is to provide an image forming apparatus configured to function as a groupware terminal and connectable to a groupware server of a groupware, the groupware server comprising at least one document database configured to store document data and attribute information corresponding to the document data and an attribute database configured to store the attribute information, the image forming apparatus comprising a scan part configured to scan a paper document and to obtain document data; a setting part configured to set a certain attribute information of the document data obtained by the scan part, by referring to the attribute information stored in the attribute database; and a sending part configured to send to the groupware server the document data having the set attribute information, so that the groupware server stores the document data having the set attribute information in the document database. According to the image forming apparatus of the present invention, it is possible to simplify the operation of forming the paper document into the electronic document data.

Still another object of the present invention is to provide a computer-readable storage medium which stores a database management program for causing a computer to function as a groupware server of a groupware which is connectable, via a network, to an image forming apparatus that functions as a groupware terminal, the groupware server comprising at least one document database configured to store document data and attribute information corresponding to the document data and an attribute database configured to store the attribute information, the database management program comprising a communicating procedure causing the computer to communicate with the image forming apparatus via the network; and a write procedure causing the computer to write the document data and the attribute information to the at least one document database, wherein the communicating procedure causes the computer to send certain attribute information to the image forming apparatus in response to an acquisition request for the certain attribute information received from the image forming apparatus, and the write procedure causes the computer to write the document data in the at least one document database in response to a write request for the document data having the certain attribute information, received by the communicating procedure from the image forming apparatus. According to the computer-readable storage medium of the present invention, it is possible to simplify the operation of forming the paper document into the electronic document data.

Other objects and further features of the present invention will be apparent from the following detailed description when read in conjunction with the accompanying drawings.

BRIEF DESCRIPTION OF THE DRAWINGS

FIG. 9 is a diagram showing an input screen of the document information displayed on the operation panel;

FIG. 17 is a diagram showing the document information that is acquired by the image forming apparatus and displayed;

FIG. 19 is a diagram for explaining a computer-readable storage medium that stores an image forming program for causing a computer to carry out procedures for realizing the functions of each of the embodiments.

DESCRIPTION OF THE PREFERRED EMBODIMENTS

[First Embodiment]

In a first embodiment of the present invention, an image forming apparatus having a scan function is made to function as a groupware terminal, so that the electronic document data of the paper document scanned by this image forming apparatus is stored directly in a groupware server. As a result, it is possible to simplify the process of forming the paper document into the electronic document data.

Figure 1:
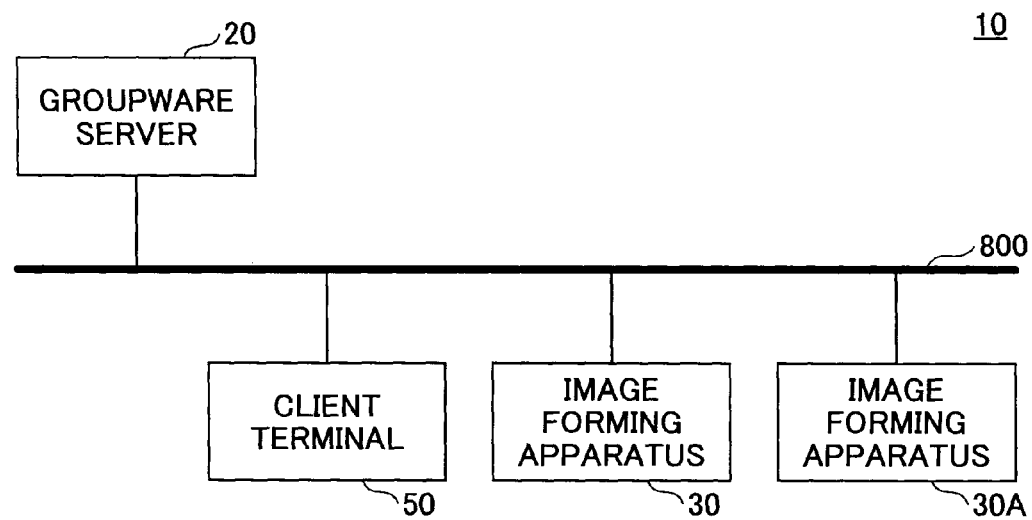
FIG. 1 is a block diagram showing a system structure of an image forming system of a first embodiment of the present invention.

FIG. 1 is a block diagram showing a system structure of an image forming system 10 of this first embodiment. The image forming system 10 includes a groupware server 20, an image forming apparatus 30 that functions as a client of the groupware, an image forming apparatus 30A that makes access to the groupware server 20 by a browser function, and a client terminal 50 of the groupware, that are connected to each other via a network 800 such as a Local Area Network (LAN), for example.

The groupware server 20 is formed by a Personal Computer (PC) which is made up of an arithmetic processing unit such as a CPU and a storage unit such as a memory, for example, and to which a groupware software for the server has been installed.

The image forming apparatus 30 has a groupware module for the client, and functions as a client terminal of the groupware. The image forming apparatus 30 has a browser function for making access to the groupware server 20. The client terminal 50 is formed by a general-purpose PC which is made up of an arithmetic processing unit and a storage unit, and to which a groupware software for the client has been installed. The client terminal 50 realizes various functions of the groupware by making a print instruction with respect to the image forming apparatuses 30 and 30A and making access to the groupware server 20.

This embodiment is characterized by the process carried out between the groupware server 20 and the image forming apparatus 30. For this reason, a description will now be given of the groupware server 20 and the image forming apparatus. A detailed description of the image forming apparatus 30A will be given later in conjunction with a second embodiment of the present invention. The groupware described hereunder is preferably a Lotus Notes/Domino (registered trademark), for example, but may be any groupware having similar or equivalent functions.

Figure 2:
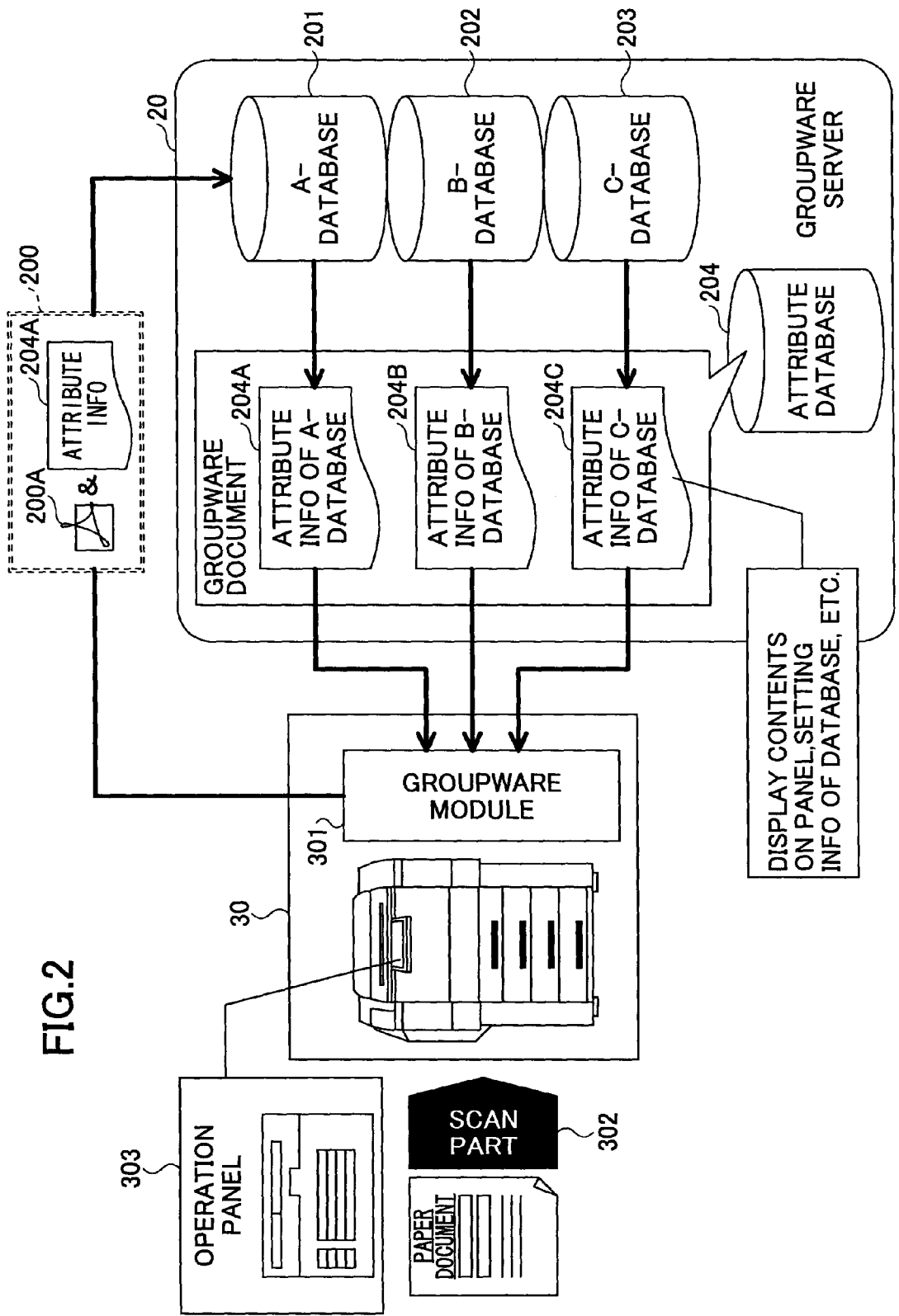
FIG. 2 is a diagram for explaining a process carried out between a groupware server and an image forming apparatus in the first embodiment.

FIG. 2 is a diagram for explaining a process carried out between the groupware server 20 and the image forming apparatus 30. The groupware server 20 is provided with an A-database 201, a B-database 202, a C-database 203 and an attribute database 204.

The A-database 201 stores document data and attribute information that is set in correspondence with the document data. This attribute information includes the information related to the format unique to the A-database 201, the file name of the document data, the storage destination address and the like. When this attribute information is added to the document data, the document data having this attribute information is identified as shared data (or common data) that is storable in the groupware server 20. In this embodiment, the shared data that is stored in the groupware server 20 and shared will be referred to as the groupware document data. Items of the information included in the attribute information will be described later in detail. Each of the B-database 202 and the C-database 203 stores the groupware document data, made up of the document data and the attribute information that is set in correspondence with the document data, similarly to the A-database 201.

Only the attribute information stored in the A-database 201, the B-database 202 and the C-database 203 is registered and stored in the attribute database 204 in advance by a manager of the image forming system 10. For example, the attribute database 204 stores attribute information 204A of the A-database 201, attribute information 204B of the B-database 202, and attribute information 204C of the C-database 203.

The image forming apparatus 30 includes a groupware module 301 for realizing functions of the groupware terminal, a scan part 302 for scanning the paper document, and an operation panel 303 that is operated by the user to carry out processes by the image forming apparatus 30. For example, the operation panel 303 may be formed by a touch-panel, a software keyboard displayed on a display part or means, or the like.

In the image forming apparatus 30, the scan part 302 scans the paper document and forms the electronic document data. The groupware document data is obtained by adding the attribute information to the electronic document data.

A description will be given of a case where the electronic document data that is obtained by scanning the paper document by the scan part 302 is stored in the A-database 201. In the image forming apparatus 30, when the user makes a selection to cause the image forming apparatus 30 to function as the groupware terminal, the groupware module 301 is started, to thereby make it possible for the image forming apparatus 30 to realize the functions of the groupware terminal. In this state, the image forming apparatus 30 can share the data with the groupware server 20, as a groupware client.

The electronic document data that is obtained by scanning the paper document by the scan part 302 is subjected to a process which converts the electronic document data into a file of a predetermined extension within the image forming apparatus 30. In this embodiment, the predetermined extension is pdf, and the electronic document data is converted into a pdf file.

Document data 200A, that has been converted into the pdf file, is added with attribute information 204A that is unique to the A-database 201 to which the electronic document data 200A is stored in the image forming apparatus 30. A description will now be given on how the attribute information is added to the document data.

The image forming apparatus 30 makes access to the attribute database 204, and acquires an attribute information list for each of the databases stored in the attribute database 204. The acquired attribute information list is displayed on the operation panel 303 in the image forming apparatus 30. When the user selects the attribute information 204A of the A-database 201, the image forming apparatus 30 acquires the attribute information 204A from the attribute database 204. When the attribute information 204A is acquired, the image forming apparatus 30 refers to design information and displays on the operation panel 303 items of information and the like based on the format unique to the attribute information 204A. When each item of the attribute information 204A is set on the operation panel 303, the set attribute information 204A is added to the electronic document data 200A to thereby obtain the groupware document data 200 that is to be stored in the groupware server 20 and is stored in the A-database 201.

Therefore, according to this embodiment, the image forming apparatus 30 and the database within the groupware server 20 collaborate, so that the electronic document data acquired by the image forming apparatus 30 can be stored directly to the database within the groupware server 20 from the image forming apparatus 30. In addition, in a case where a plurality of databases exist within the groupware server 20, the user may arbitrarily select the database that is to collaborate with the image forming apparatus 30, and store the electronic document data directly to the selected database.

In addition, by registering the attribute information unique to the database in the attribute database 204 in advance, and displaying the attribute information within the attribute database 204 on the operation panel 303, it is possible to let the user operate the image forming system 10 as if the user were making direct access to the database that stores the attribute information. Furthermore, the image forming apparatus 30 and the database within the groupware server 20 can be made to collaborate by simply registering the attribute information in the attribute database 204, without having to modify the existing database design. As a result, it is possible to effectively utilize the existing database resources of the user.

Figure 3:
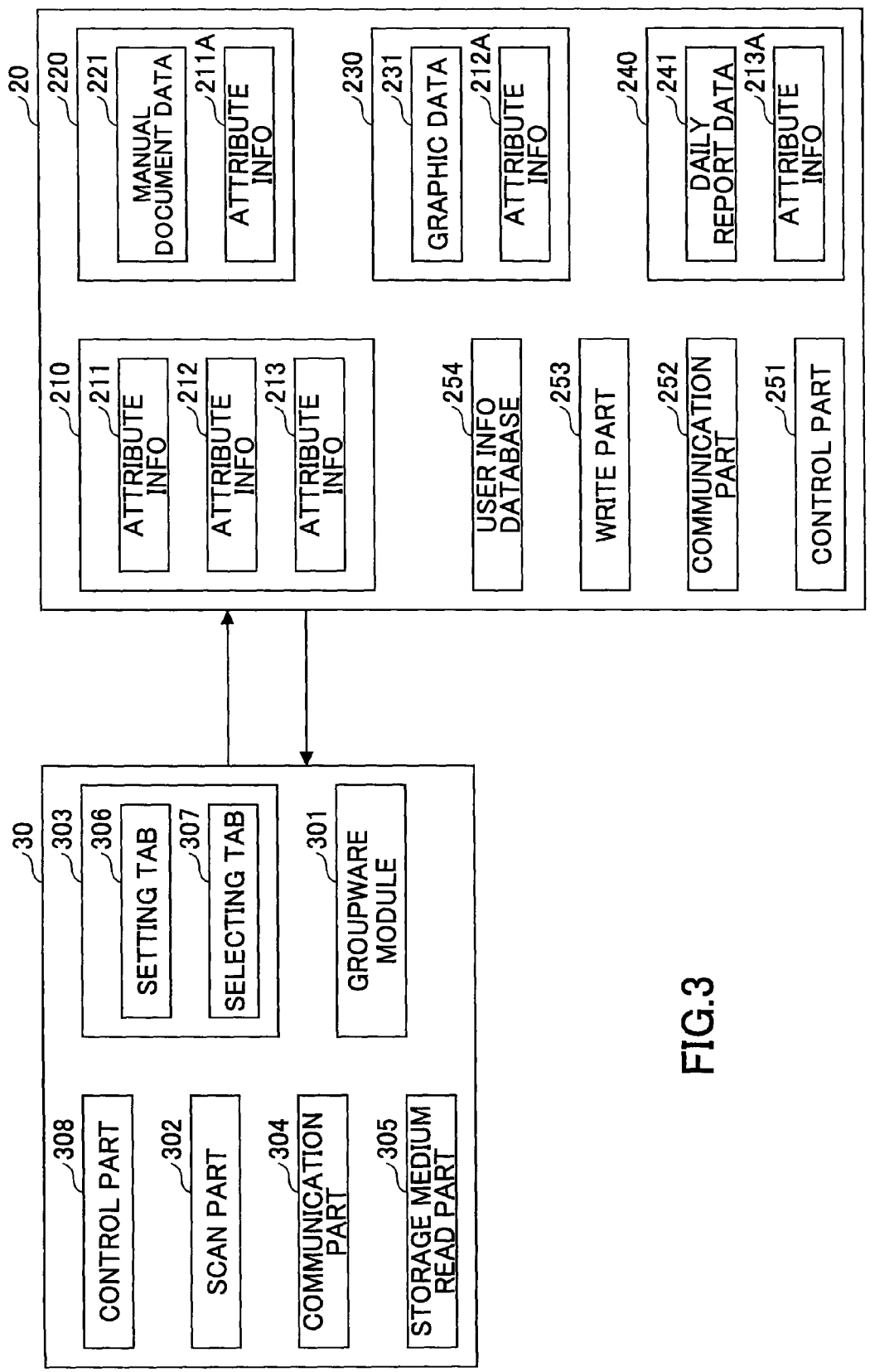
FIG. 3 is a functional block diagram of the groupware server and the image forming apparatus of the first embodiment.

Next, a more detailed description will be given of the process carried out in this embodiment. FIG. 3 is a functional block diagram of the groupware server 20 and the image forming apparatus 30 of this embodiment.

The groupware server 20 includes an attribute database 210, a manual document database 220, a graphic database 230, a daily report database 240, a control part 251, a communication part 252, a write part 253, and a user information database 254. For example, the attribute database 210 corresponds to the attribute database 204 shown in FIG. 2, and the databases 220, 230 and 240 correspond to the databases 201, 202 and 203 shown in FIG. 2.

Attribute information 211 unique to the manual document database 220, attribute information 212 unique to the graphic database 230, and attribute information 213 unique to the daily report database 240 are registered and stored in the attribute database 210 in advance by a system manager or the like in an initial setting state.

For example, the manual document database 220 stores the document data for creating manuals of products developed by a company. More particularly, the manual document database 220 stores manual document data 221, and attribute information 211A that is set in correspondence with the manual document data 211. For example, the graphic database 230 stores design drawings and the like of the products developed by the company. More particularly, the graphic database 230 stores graphic data 231, and attribute information 212A that is set in correspondence with the graphic data 231. For example, the daily report database 240 stores the daily report and the like created daily within the company. The daily report database 240 stores daily report data 241, and attribute information 213A that is set in correspondence with the daily report data 241.

A description will be given of the attribute information. The attribute information is added to the document data of the paper document that is scanned. The document data obtained by scanning the paper document becomes the groupware document data that is storable in the database within the groupware server 20 when added with this attribute information.

For example, the attribute information includes environment information of the groupware, document information related to the document data stored in the database, and setting information of the document database to which the document data is stored. The document information is set with a format unique to each database within the groupware server 20, and every time the document data is acquired by the scan made in the image forming apparatus 30, the document information is set in correspondence with the document data.

The document information of the manual document database 220 includes items necessary for managing the manual document. For example, the items include the name of the document data, the file name of the document data when the document data is stored as a document data file having the attribute information, the type of document data indicating whether or not the document is confidential, the name of the creator of the document data, the date and time when the document data is created, page information in which the document data is arranged, a search keyword used to search the document data, and the like. Information based on a predetermined format is input and set to each of such items of the document information in the manual document database 220.

The document information of the graphic database 230 includes items such as the drawing number, the name of the creator, and the type of drawing indicating whether or not the drawing is a color drawing or a monochrome drawing. Similarly, the document information of the daily report database 240 includes items such as the name of the creator, the name of the department or section to which the creator belongs, and the date and time of creation.

The setting information includes information related to the predetermined format that is used when setting each item of the document information, address information of each database required by the image forming apparatus 30 to make access to each database, the name of the database, and the like. When storing the document data in the database that collaborates with the image forming apparatus 30, the image forming apparatus 30 makes access to the collaborating destination database by referring to the setting information of the collaborating destination database, and stores the document data in the collaborating destination database.

In the case of the manual document database 220, the information related to the predetermined format indicates the alphabet for the item of the file name of the document data, an 8-digit number for the item of the date and time of creation of the document data, and the Japanese Kana characters for the item of the name of creator of the document data. When the user sets the document information in the image forming apparatus 30, the information of each item is input according to this information related to the predetermined format.

When the system manager registers the attribute information 211, 212 and 213 in the attribute database 210, the system manager displays on the image forming apparatus 30 the items of the document information to be selected and set by the user. The attribute database 210 can automatically acquire from the design information of each database the information related to the format of the selected item. This information related to the format may include, in addition to the information related to the predetermined format described above, the method of inputting the document information, the initial set value of each item, the options or alternatives, the data type and the like.

Accordingly, when registering the attribute information in the attribute database 210, the attribute database 210 can automatically acquire from the design information of each database the information related or annexed to the attribute information, and for this reason, it is possible to simplify the operation of the system manager to register the attribute information.

The control part 251 controls the processes executed by the groupware server 20. The communication part 252 enables the groupware server 20 to communicate with the image forming apparatus 30 and other groupware terminals. The write part 253 carries out a process to write the document data sent from the image forming apparatus 30 in each database. The user information database 254 stores the user information that is used by the user when making a log-in to the image forming system 10.

The image forming apparatus 30 includes, in addition to the groupware module 301, the scan part 302 and the operation panel 303, a communication part 304, a storage medium read part 305 and a control part 308. The communication part 304 enables the image forming apparatus 30 to communicate with the groupware server 20 and the other groupware terminals. The storage medium read part 305 is formed by a Universal Serial Bus (USB) driver for reading information from the USB memory, for example. The storage medium read part 305 can read the user information from the USB memory that is recorded with the user information. The control part 308 controls the processes executed by the image forming apparatus 30.

The operation panel 303 includes a setting tab 306 for displaying an input screen on which the attribute information is set, and a selecting tab 307 for displaying a selection screen on which the attribute information to be referred to is selected from the list of attribute information stored in the attribute database 210. A more detailed description on the operation panel 303 will be given later in the specification by referring to screen transition diagrams.

Figure 4:
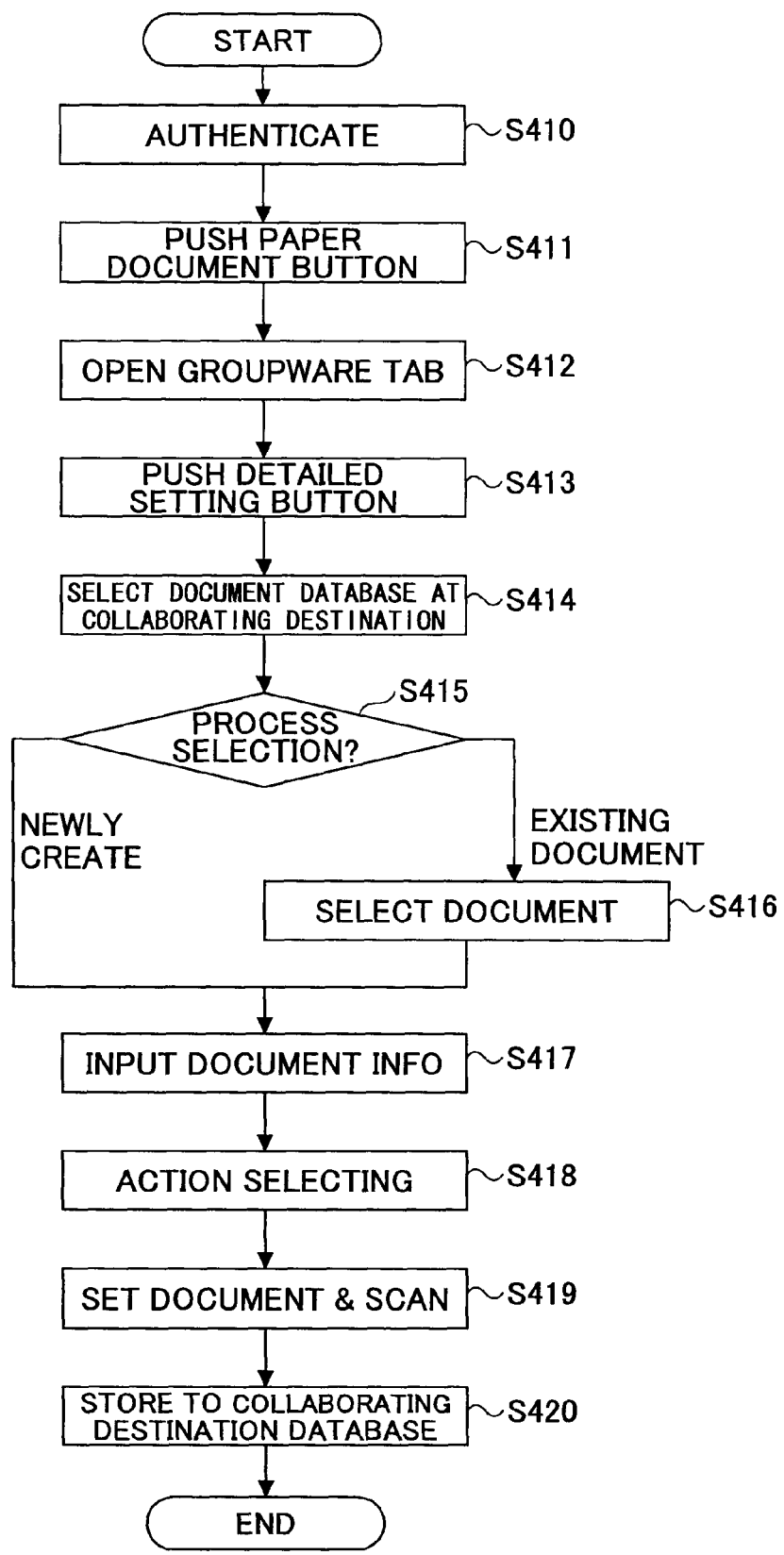
FIG. 4 is a flow chart for explaining a process carried out in the image forming system of the first embodiment.

Next, a description will be given of the process of this embodiment, by referring to a flow chart shown in FIG. 4 and the screen transition diagrams of the operation panel 303 shown in FIGS. 5 through 11. FIG. 4 is a flow chart for explaining the process carried out in the image forming system 10 of this embodiment.

When using the groupware function of the image forming apparatus 30, the user must first make a log-in to a personal menu function of the image forming apparatus 30, and then make a log-in to the groupware. The personal menu function refers to the function that is usable only by the user who has his user ID and his password registered in advance in the image forming apparatus 30. The functions executable in the personal menu function include the access to and inspection of the image data and electronic document data stored for each user within the image forming apparatus 30, the use of an address directory of the individual user, the inspection of the mail document data of the individual user, and the like.

In the image forming apparatus 30 of this embodiment, the user information used to make the log-in to the groupware can be used to simultaneously make the log-in to the personal menu function of the image forming apparatus 30. A description will now be given of a user authentication of this embodiment.

When a storage medium, such as the USB memory, that prestores the user information including the user ID and the password for making the log-in to the groupware is connected (plugged into) the storage medium read part 305, the control part 308 acquires the user ID and the password by reading the user ID and the password from the storage medium. The storage medium may store, in addition to the user ID and the password, a license of the groupware, the authentication expiry date (or authentication valid term), the enciphering key and the like.

In the image forming apparatus 30, a software keyboard or the like, which enables the user to input the password, is displayed on the operation panel 303. When the user inputs the password from the operation panel 303, the control part 308 carries out a process to judge whether or not the password acquired from the storage medium and the password input by the user match. If the password acquired from the storage medium and the password input by the user match, the control part 308 authenticates this user (S410).

In this user authentication process, if the password acquired from the storage medium and the password input by the user do not match, the control part 308 does not authenticate the user, and error information related to the user authentication process may be displayed on the operation panel 303. After the image forming apparatus 30 acquires the user ID and the password from the storage medium, the image forming apparatus 30 may store the acquired user ID and password in an internal memory or the like, and carry out the next and subsequent user authentication processes using the user ID and the password that are stored in the internal memory.

Figure 5:
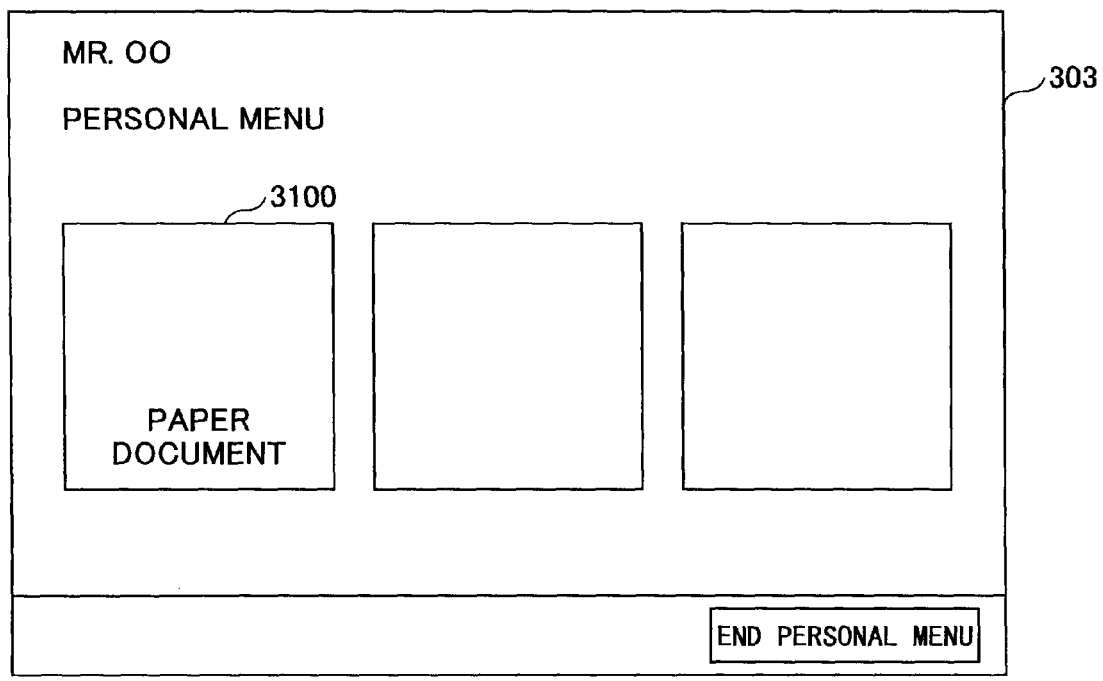
FIG. 5 is a diagram showing an operation panel after a log-in to a personal menu function.
Figure 6:
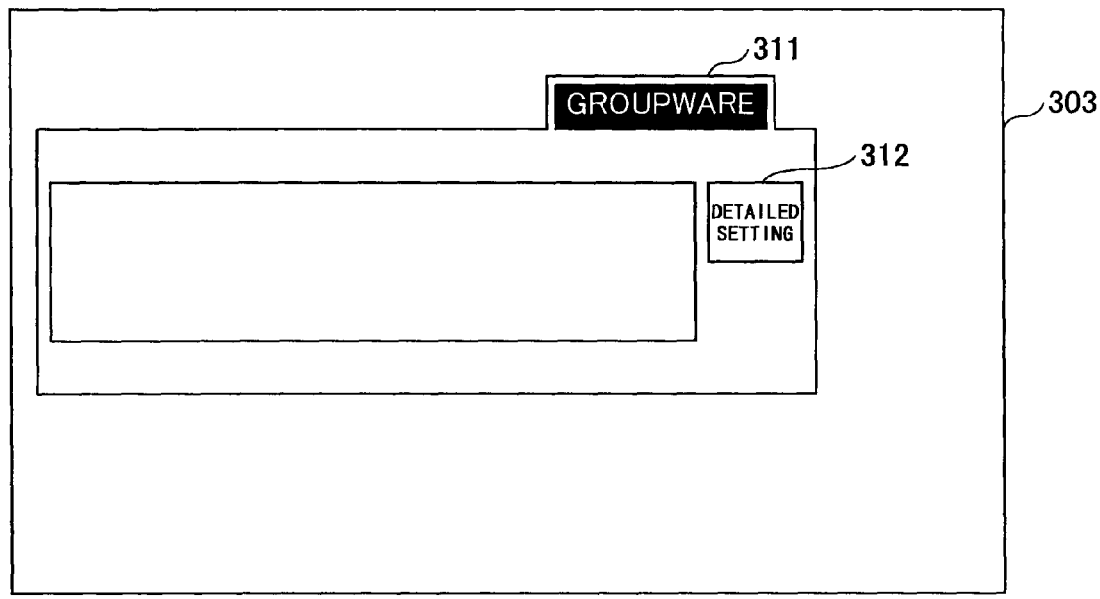
FIG. 6 is a diagram showing the operation panel displaying a groupware function tab.

After the user authentication in the step S410, the image forming apparatus 30 regards that the log-in is simultaneously made to the groupware and the personal menu function, and displays on the operation panel 303 an operation screen that is used after the log-in to the personal menu function. FIG. 5 is a diagram showing the operation panel 303 after the log-in to the personal menu function. If a "paper document" button 3100 specifying a scan function is pushed by the user (S411), the control part 308 of the image forming apparatus 30 displays on the operation panel 303 a groupware function tab 311 for starting the groupware module 301 (S412). FIG. 6 is a diagram showing the operation panel 303 displaying the groupware function tab 311.

When the groupware function tab 311 is selected, the groupware module 301 is started, and the image forming apparatus 30 functions as the groupware terminal. The functions of the groupware terminal includes, in addition to the function of directly storing the document data in the database, a search function for making a search in the database within the groupware server 20, a file send function for sending a predetermined document data stored in the database to a specified distribution destination, a mail sending and receiving function, and the like. When the user pushes a detailed setting button 312 on the operation panel 303 in FIG. 6 (S413), the image forming apparatus 30 regards this operation as an attribute information acquisition request and sends this attribute information acquisition request (or signal) to the groupware server 20.

Figure 7:
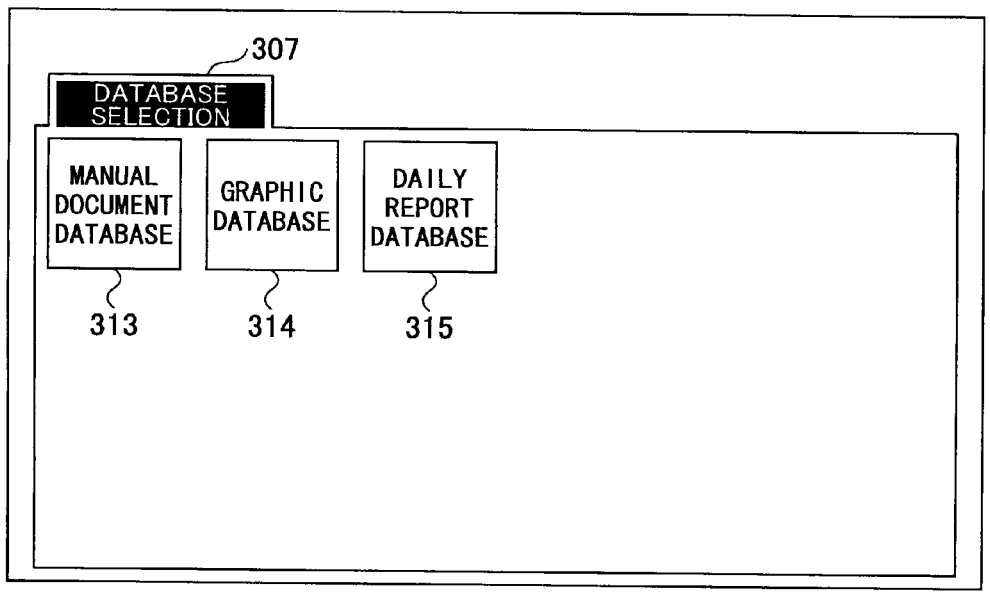
FIG. 7 is a diagram showing a list of attribute information displayed on the operation panel.

Responsive to the attribute information acquisition request, the control part 251 of the groupware server 20 sends a list of the attribute information stored in the attribute database 210 to the image forming apparatus 30. The image forming apparatus 30 acquires this list of the attribute information and displays this list on the operation panel 303. FIG. 7 is a diagram showing this list of the attribute information displayed on the operation panel 303. Since the image forming apparatus 30 functions as the groupware terminal, a groupware screen is displayed on the operation panel 303 as shown in FIG. 7, including a database selection tab 307.

As described above in conjunction with FIG. 3, the attribute database 210 of this embodiment includes the attribute information 211 of the manual document database 220, the attribute information 212 of the graphic database 230, and the attribute information 213 of the daily report database 240. Hence, a button 313 for selecting the attribute information 211, a button 314 for selecting the attribute information 212, and a button 315 for selecting the attribute information 213 are displayed on the operation panel 303 as shown in FIG. 7.

The user selects a button corresponding to the attribute information of the database that is to collaborate with the image forming apparatus 30, from the list of the attribute information displayed on the operation panel 303, so as to make an arbitrary database collaborate with the image forming apparatus 30 (S414).

When the database that is to collaborate is selected, the image forming apparatus 30 carries out a process to confirm whether or not the user has the authority to (that is, has the right to) make access to the selected database. In other words, the user ID and the password authenticated in the step S410 are sent to the groupware server 20 via the communication part 304. The control part 251 of the groupware server 20 receives the user ID and the password, and carries out a process to confirm whether or not a matching user ID and a matching password are stored within the information database 254.

If the user information database 254 stores a matching user ID and a matching password that respectively match the user ID and the password sent from the image forming apparatus 30, the control part 251 judges that the user has the authority to make access to the database within the groupware server 20, and permits the access to the database.

In this embodiment, the manual document database 220 collaborates with the image forming apparatus 30. Hence, the user pushes the button 313 for selecting the attribute information 211 on the operation panel 303 shown in FIG. 7.

Figure 8:
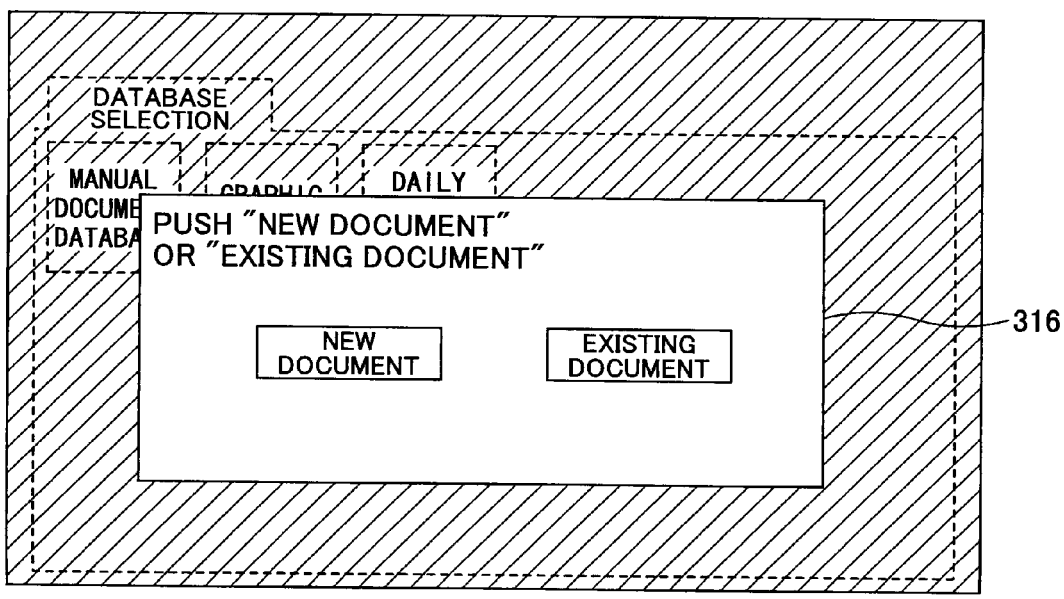
FIG. 8 is a diagram showing a screen, including a window, for selecting a process for storing document data in a new document data file or a process for storing the document data in an existing document data file.

When the database at the collaborating destination of the image forming apparatus 30 is selected in the step S414, the image forming apparatus 30 urges the user to select a process of storing the paper document that is scanned in the database as a new document data file or, a process of additionally storing the paper document that is scanned in an existing document database file within the database (S415). FIG. 8 is a diagram showing a screen, including a window 316, for selecting the process for storing the document data in the new document data file or the process for storing the document data in the existing document data file.

In the step S415, if the process for storing the document data in the new document data file is selected by pushing a "new document" button on the screen shown in FIG. 8, the image forming apparatus 30 starts the process of storing the new document data in the manual document database 220.

The control part 308 displays on the control panel 303 an input screen for setting the document information included in the attribute information of the manual document database 220. In this state, the document information is displayed in a state where the initial values are input. FIG. 9 is a diagram showing an input screen of the document information displayed on the operation panel 303. As shown in FIG. 9, the file name stored in the manual document database 220, the document name of the document data obtained by scanning the paper document, the search keyword used to search the document data and the like are input from the operation panel 303 (S417). When the document information is set, the attribute information 211 is added to the document data as the attribute information 211A that is set in correspondence with the document data.

Next, the screen of the operation panel 303 makes a transition to an action selection screen. An action function refers to the function that executes a predetermined process with respect to the document data that is added with the set attribute information. The predetermined process that is executed by the action function may be arbitrarily set by the user. In addition, an operation member that is operated to issue an execute instruction to execute this predetermined process is referred to as an "action" button.

Figure 10:
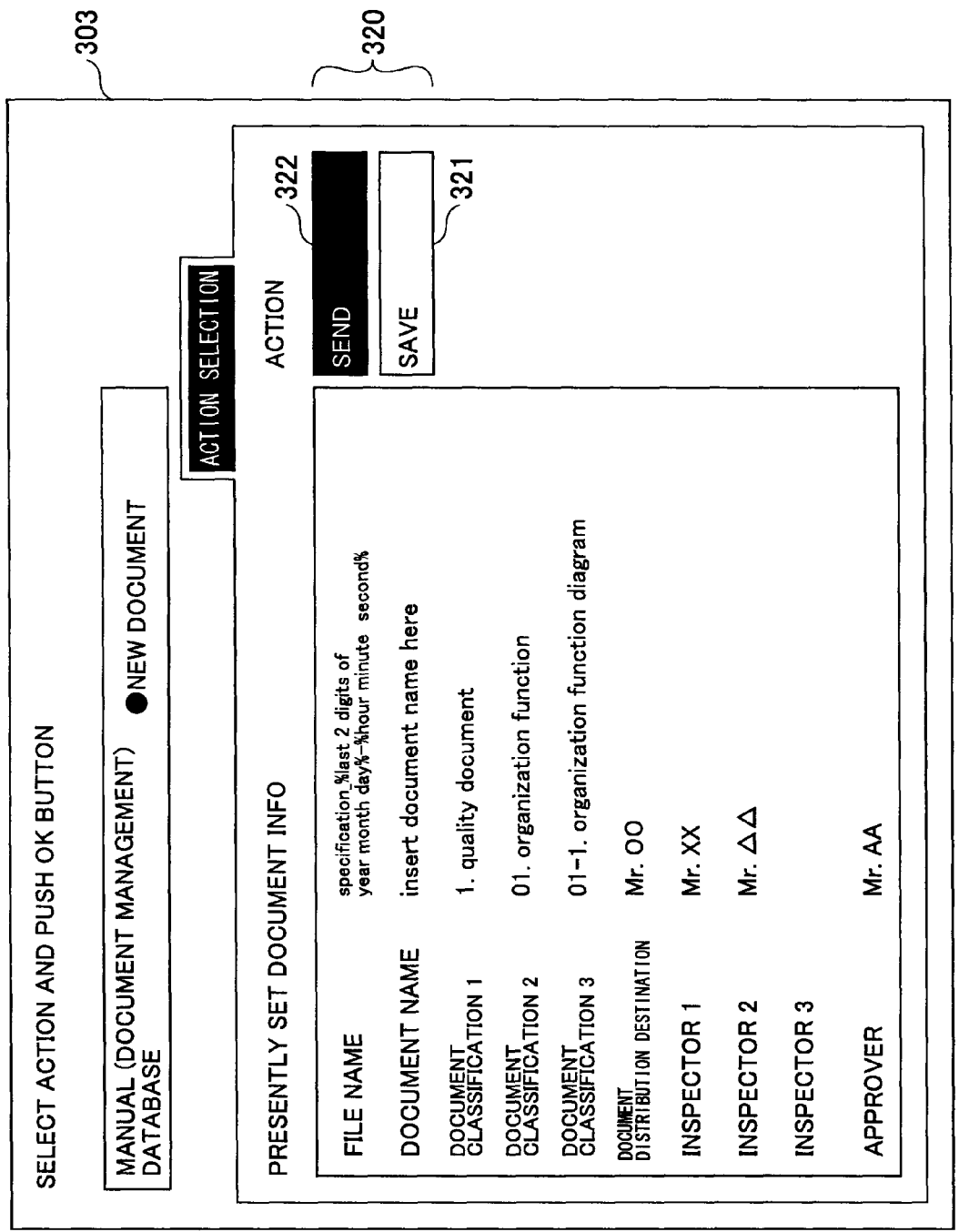
FIG. 10 is a diagram showing an action selection screen displayed on the operation panel.

FIG. 10 is a diagram showing an action selection screen displayed on the operation panel 303. As shown in FIG. 10, action buttons 320 and the document information set in the step S417 are displayed on the operation panel 303, and the user can instruct the control part 308 to execute a process with respect to the document data by pushing one action button 320 while confirming the document information.

In this embodiment, the action buttons 320 include a save button 321 that instructs a save process to save the document data, and a send button 322 that instructs a send process to send the document data. If the user selects the save button 321 (S418), for example, the control part 308 executes the save process to store the document data having the attribute information 211A in the manual document database 220.

The control part 308 sends the document data having the attribute information 211A to the groupware server 20 via the communication part 304. The groupware server 20 receives the document data via the communication part 252. The write part 253 executes a write process to write the document data in the manual document database 220 together with the attribute information 211A, based on the setting information of the manual document database 220 included in the attribute information 211A. Accordingly, the document data is stored in the manual document database 220 together with the attribute information 211A, and saved.

When displaying the action buttons 320 on the operation panel 303 as shown in FIG. 10, the user may arbitrarily set the text display within the action buttons 320. For example, although the text display within the "save" button 321 is "save" in FIG. 10, the text display may be "store" or "register", for example.

On the other hand, if the "send" button 322 is pushed in FIG. 10, the control part 308 may execute a process to distribute the document data having the attribute information 211A to the distribution address that is preset in the step S417. If the distribution destination of the document data is an inspector who inspects the document data (or an examiner who examines the document data), for example, the text display of the "send" button 322 may be "inspection request". In addition, if the distribution destination of the document data is an approver or acknowledger who approves or acknowledges the document data, for example, the text display of the "send" button 322 may be "approve" or "acknowledge".

After the various settings with respect to the document data to be acquired by the scan are completed, the user sets the paper document on the scan part 302 of the image forming apparatus 30 and the paper document is scanned (S419). When the document data is obtained by the scan, the control part 308 carries out a process based on the settings made by the steps S413 through S418. In other words, the control part 308 carries out the process of adding the set attribute information 211A to the document data, and regarding the document data as the groupware document data. This groupware document data from the image forming apparatus 30 is stored directly to the manual document database 220 (S420).

Therefore, according to this embodiment, it is possible to carry out a process similar to that of the client terminal 50 of the groupware by operating the operation panel 303 of the image forming apparatus 30. In addition, it is possible to store the document data that is obtained by the scan function of the image forming apparatus 30, as the groupware document data, directly to the collaborating destination database within the groupware server 20. For this reason, it is possible to greatly simplify the operation of forming the paper document into the electronic document data.

Moreover, since the document information is set by referring to the information that is stored in the attribute database 210 and is related to the format unique to the collaborating destination database, it is possible to set the document information in the image forming apparatus 30 with an appropriate format. Even in a case where the collaborating destination database is an existing database, the setting information of the existing database may be registered in the attribute database 210, so that the document data obtained by the scan in the image forming apparatus 30 is set to a data format in accordance with the format information included in the setting information. Hence, it is possible to store the document data that is set to the format unique to the database, directly from the image forming apparatus 30 without requiring the database design to the modified, and the existing database resources can be easily and effectively utilized in the image forming system 10.

Furthermore, because the search keyword used to search the document data is set in the document information that is included in the attribute information, it is possible to easily search and retrieve the document data using the search keyword even after the document data is stored within the groupware server 20 as the groupware document data.

Next, a description will be given of a case where the process of additionally storing the paper document that is scanned in the existing document database file within the database is selected in the step S415 shown in FIG. 4. When an "existing document" button is pushed on the screen shown in FIG. 8, the image forming apparatus 30 acquires a list of existing document data files stored within the manual document database 220.

The control part 308 sends an acquisition request for the list of the document data files to the groupware server 20 via the communication part 304. In the groupware server 20, the control part 251 receives the acquisition request for the list of the document data files, and acquires a list 318 of the document data files stored in the manual document database 20. The groupware server 20 sends this list 318 to the image forming apparatus 30 via the communication part 252.

Figure 11:
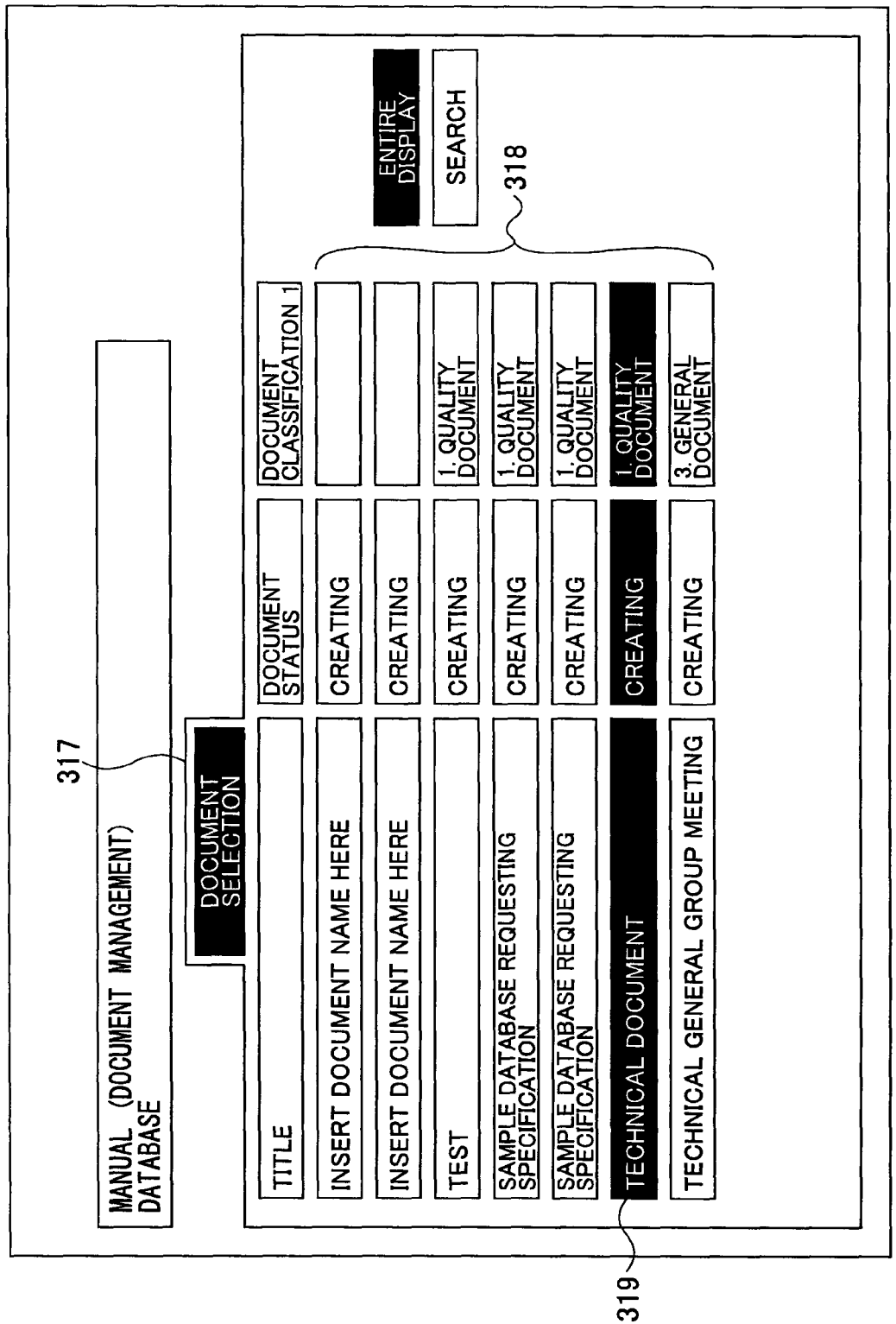
FIG. 11 is a diagram showing a list of document data files displayed on the operation panel.

When the control part 308 acquires the list 318 of the document data files, the control part 308 displays this list 318 of the document data files on the operation panel 303 in a selectable manner. FIG. 11 is a diagram showing the list 318 of the document data files displayed on the operation panel 303. The user selects the document data file to which the document data that is obtained by the scan is to be added, from the list 318 of the document data files displayed on the operation panel 303 (S416). In this embodiment, it is assumed for the sake of convenience that a technical document file 319 is selected from the list 318 as the document data file.

When the document data file is selected, the control part 308 sends to the groupware server 20 the acquisition request for the document information that has been set and is included in the attribute information of the selected document data file. In other words, the acquisition request for the document information that has been set and is included in the attribute information of the selected technical document file 319 is sent to the groupware server 20 in this embodiment. The control part 251 of the groupware server 20 receives the acquisition request from the control part 308, and acquires the document information requested thereby. A description will now be given of the process of acquiring the requested document information.

When the control part 251 receives the acquisition request for the document information that has been set and is included in the attribute information of the selected document file, the control part 251 makes an access to the attribute database 210, and refers to the attribute information of the collaborating destination database that is selected in the step S414 and collaborates with the image forming apparatus 30. In this embodiment, the control part 251 refers to the attribute information 211 of the manual document database 220. Next, the control part 251 makes access to the manual document database 220 based on the setting information of the manual document database 220 included in the attribute information 211. Then, the control part 251 acquires the document information from the attribute information of the technical document file 319 which is the selected document data file. The control part 251 sends the acquired document information to the image forming apparatus 30 via the communication part 252.

When the image forming apparatus 30 acquires the document information sent from the groupware server 20, the control part 308 displays the acquired document information on the operation panel 303. The document information that is displayed in this case is the document information that has been set when storing the technical document file 319 in the manual document database 220 as the new groupware document data. In other words, the document information of the technical document file 319 is displayed on the input screen shown in FIG. 9 in a state where the information that has already been set is input.

In the step S417, the user may newly input the document information displayed on the input screen. The process after the step S417 is the same as the process described above that is carried out when the new document data is stored, and a description thereof will be omitted.

Therefore, according to this embodiment, it is possible to add new document data in an arbitrary existing document data file that is stored within the groupware server 20.

[Second Embodiment]

Figure 12:
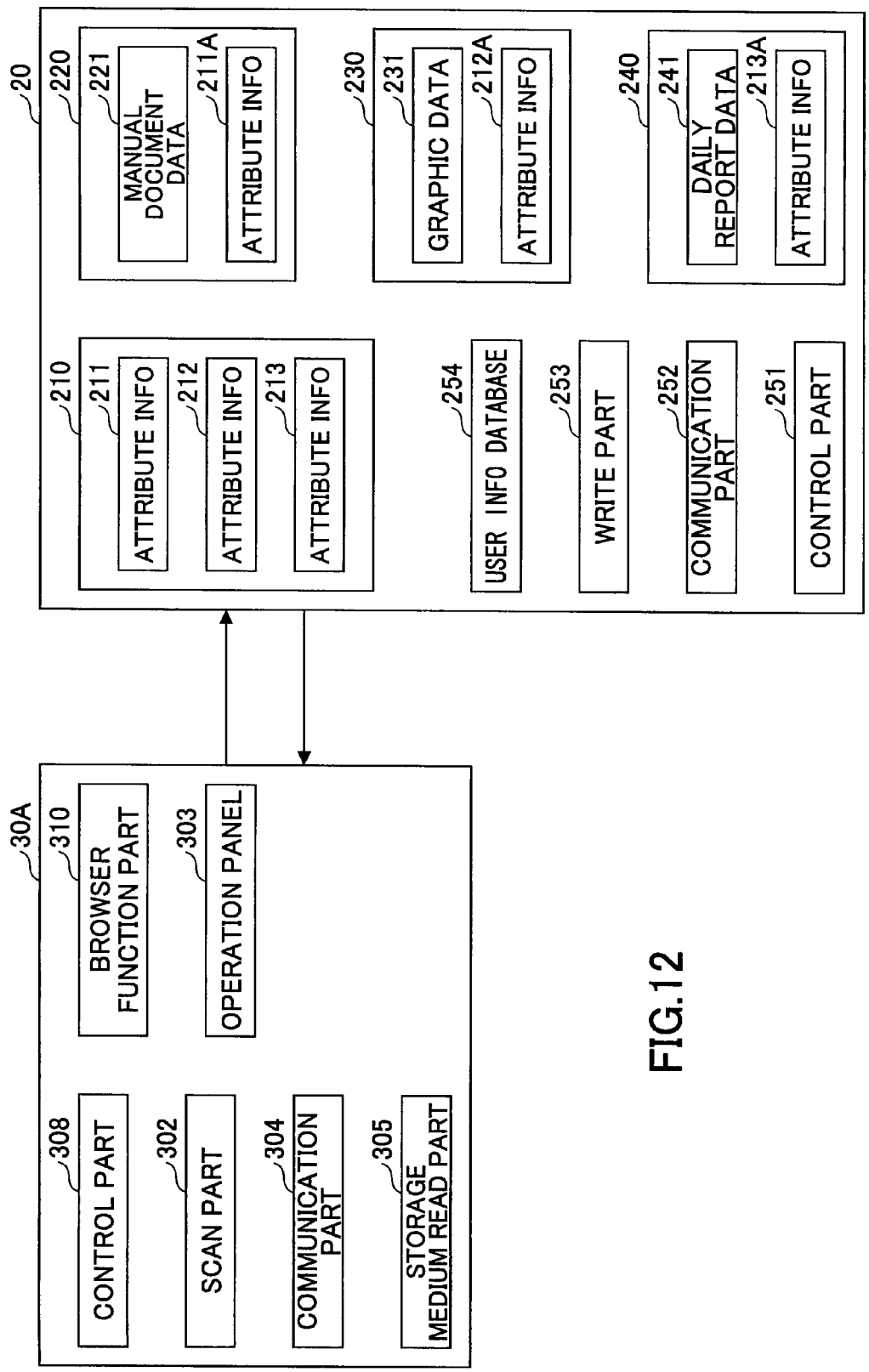
FIG. 12 is a functional block diagram of the groupware server and the image forming apparatus of a second embodiment of the present invention.

Next, a description will be given of a second embodiment of the present invention. The system structure of the image forming system 10 of this second embodiment is the same as that shown in FIG. 1, and a description thereof will be omitted. FIG. 12 is a functional block diagram of the groupware server 20 and the image forming apparatus 30A of a second embodiment of the present invention. In FIG. 12, those parts that are the same as those corresponding parts in FIG. 3 are designated by the same reference numerals, and a description thereof will be omitted. Unlike the first embodiment described above, the image forming apparatus 30A of this second embodiment is not provided with a groupware module, but instead, is provided with a browser function part 310 that can make access to the groupware server 20.

The browser function part 310 is formed by an application software for making access to the groupware server 20, and is installed in the image forming apparatus 30A, for example. On the other hand, the groupware server 20 has a servlet (not shown) that corresponds to the browser function part 310. The servlet is a Java (registered trademark) program that operates in the groupware server 20, and the control part 251 executes the servlet based on a process instruction from the browser function part 310 of the image forming apparatus 30A.

Accordingly, the image forming apparatus 30A can make access to the groupware server 20 although it does not have a groupware module as in the case of the first embodiment described above. In addition, it is possible to display the data stored in the groupware server 20 on the operation panel 303, and to store the document data obtained from the scan part 302 in the database within the groupware server 20, by the functions of the browser function part 310.

Furthermore, in this embodiment, the user authentication process of the step S410 shown in FIG. 4 is different from that of the first embodiment described above. A description will now be given of the user authentication process of this embodiment. In the image forming apparatus 30A of this embodiment, the user ID and the password for making the image forming apparatus 30A usable by the user are input by the user from the operation panel 303.

The image forming apparatus 30A makes the user authentication based on the user ID and the password, and sends the user ID and the password to the groupware server 20. The user information database 254 of the groupware server 20 prestores the user information for making the image forming apparatus 30A usable, in a collaborated manner to the user information for making the log-in to the groupware. The control part 251 makes the user authentication based on the user ID and the password received from the image forming apparatus 30A and the user information database 254.

The process of this embodiment after the user authentication is similar to the process of the step S411 and the subsequent steps shown in FIG. 4 of the first embodiment described above, and a description thereof will be omitted. In this embodiment, the user who is authenticated by the user authentication is judged as having the authority to make access to the database within the groupware server 20.

[Third Embodiment]

Next, a description will be given of third embodiment of the present invention which further enables simple editing of the electronic document data. In this embodiment, the electronic document data stored in the groupware server is read by the image forming apparatus and is directly edited in the image forming apparatus.

The system structure of the image forming system 10 of this third embodiment is the same as that shown in FIG. 1, and a description thereof will be omitted. This embodiment is characterized by the process carried out between the groupware server 20 and the image forming apparatus 30. There are the following two processes carried out between the groupware server 20 and the image forming apparatus 30.

According to a first process, the electronic document data that is obtained by scanning the paper document in the image forming apparatus 30, is added with the attribute information corresponding to the electronic document data. Then, the electronic document data and the corresponding attribute information are stored directly from the image forming apparatus 30 to the groupware server 20.

According to a second process, the image forming apparatus 30 reads the electronic document data and the corresponding attribute information that are stored in the groupware server 20, and edits the electronic document data and/or the corresponding attribute information. The edited electronic document data and/or corresponding attribute information are overwritten to the groupware server 20. As in the case of the first embodiment described above, the groupware is preferably a Lotus Notes/Domino (registered trademark), for example, but may be any groupware having similar or equivalent functions.

Figure 13:
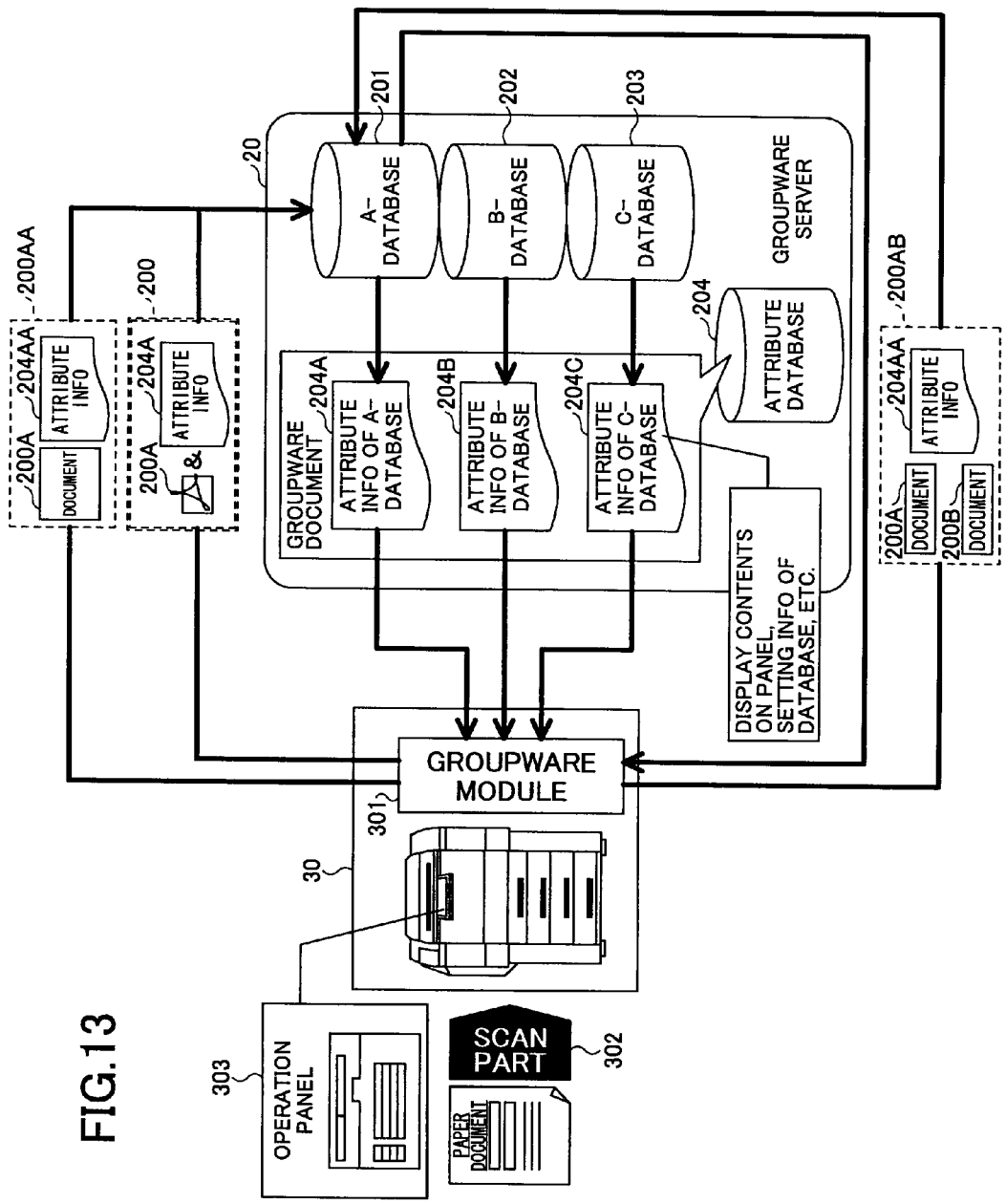
FIG. 13 is a diagram for explaining a process carried out between a groupware server and an image forming apparatus in a third embodiment of the present invention.

FIG. 13 is a diagram for explaining a process carried out between the groupware server 20 and the image forming apparatus 30 in this embodiment. In FIG. 13, those parts that are the same as those corresponding parts in FIG. 2 are designated by the same reference numerals, and a description thereof will be omitted.

A description will be given of the first process carried out between the groupware server 20 and the image forming apparatus 30. In this case, it is assumed for the sake of convenience that the document data obtained by the scan made by the scan part 302 is to be stored in the A-database 201 shown in FIG. 13.

In the image forming apparatus 30, when a selection is made by the user to make the image forming apparatus 30 function as a groupware terminal, the groupware module 301 is started so that the image forming apparatus 30 can realize the functions of the groupware terminal. Then, the image forming apparatus 30 can share the data with the groupware server 20, as a groupware client.

The electronic document data that is obtained by scanning the paper document by the scan part 302 is subjected to a process which converts the electronic document data into a file of a predetermined extension within the image forming apparatus 30. In this embodiment, the predetermined extension is pdf, and the electronic document data is converted into a pdf file.

The document data 200A, that has been converted into the pdf file, is added with the attribute information 204A that is unique to the A-database 201 to which the electronic document data 200A is stored in the image forming apparatus 30. A description will now be given on how the attribute information is added to the document data.

The image forming apparatus 30 makes access to the attribute database 204, and acquires an attribute information list for each of the databases stored in the attribute database 204. The acquired attribute information list is displayed on the operation panel 303 in the image forming apparatus 30. When the user selects the attribute information 204A of the A-database 201, the image forming apparatus 30 acquires the attribute information 204A from the attribute database 204. When the attribute information 204A is acquired, the image forming apparatus 30 refers to the design information of the A-database 201 included in this attribute information 204A, and displays on the operation panel 303 the items of information and the like based on the format unique to the attribute information 204A.

When the items of the information are displayed on the operation panel 303 of the image forming apparatus 30, the user inputs or selects the setting of each item on the operation panel 303. When each item of the attribute information 204A is set on the operation panel 303, the set attribute information 204A is added to the electronic document data 200A to thereby obtain the groupware document data 200 that is to be stored in the groupware server 20 and is stored in the A-database 201.

Therefore, according to this embodiment, the image forming apparatus 30 and the database within the groupware server 20 collaborate, so that the electronic document data acquired by the image forming apparatus 30 can be stored directly to the database within the groupware server 20 from the image forming apparatus 30. In addition, in a case where a plurality of databases exist within the groupware server 20, the user may arbitrarily select the database that is to collaborate with the image forming apparatus 30, and store the electronic document data directly to the selected database.

In addition, by registering the attribute information unique to the database in the attribute database 204 in advance, and displaying the attribute information within the attribute database 204 on the operation panel 303, it is possible to let the user operate the image forming system 10 as if the user were making direct access to the database that stores the attribute information. Furthermore, the image forming apparatus 30 and the database within the groupware server 20 can be made to collaborate by simply registering the attribute information in the attribute database 204, without having to modify the existing database design. As a result, it is possible to effectively utilize the existing database resources of the user.

Next, a description will be given of the second process carried out between the groupware server 20 and the image forming apparatus 30, by referring to FIG. 2. In this case, it is assumed for the sake of convenience that the image forming apparatus 30 reads the groupware document data 200 stored in the A-database 201 and edits the groupware document data 200.

When the image forming apparatus 30 functions as the groupware terminal, the image forming apparatus 30 can read the groupware document data stored within the groupware server 20.

When the user inputs an instruction to read the groupware document data 200 stored in the A-database 201 from the operation panel 30 of the image forming apparatus 30, the image forming apparatus 30 reads the groupware document data 200 from the groupware server 20, and displays the attribute information 204A of the groupware document data 200 on the operation panel 303.

Each item of the information in the displayed attribute information 204A has already been set. For example, the setting of each item of the attribute information 204A may be changed by the user by operating a software keyboard or the like that is displayed on the operation panel 303 simultaneously as the attribute information 204A. In other words, the software keyboard or the like displayed on the operation panel 303 forms a changing (or modifying) part of means for changing (or modifying) the attribute information.

For example, the attribute information 204A is changed to attribute information 204AA, and the image forming apparatus 30 again adds this attribute information 204AA to the document data 200A. As a result, the groupware document data 200 is changed to a groupware document data 200AA, and this groupware document data 200AA is overwritten to the groupware server 20 at the location where the groupware document data 200 was stored. In other words, the groupware document data 200AA is stored in the A-database 201.

Hence, according to this embodiment, the image forming apparatus 30 can directly change and edit the attribute information of the groupware document data that has once been stored in the groupware server 20.

In addition, the image forming apparatus 30 can add the document data of the newly scanned paper document to the groupware document data 200 that is read. A description will now be given of a case where the attribute information 204A of the groupware document data 200 is changed, and a new document data 200B is further added.

When adding a new document, the image forming apparatus 30 first reads the groupware document data to which the new document data 200B is to be added. In this particular case, the image forming apparatus 30 reads the groupware document data 200.

Next, the image forming apparatus 30 scans the paper document that is to be newly scanned by the scan part 302, so as to obtain the new document data 200B. The image forming apparatus 30 adds this new document data 200B to the groupware document data 200. In this state, it is possible to change the setting of each item of the attribute information 204A of the groupware document data 200 that needs to be changed due to the addition of the new document data 200B. By this addition of the new document data 200B to the groupware document data 200, the attribute information 204A is changed to the attribute information 204AA, and the groupware document data 200 is changed to a groupware document data 200AB.

The image forming apparatus 30 overwrites the groupware document data 200AB to the location where the groupware document 200 was stored. In other words, the groupware document data 200AB is stored in the A-database 201.

Therefore, according to this embodiment, the image forming apparatus 30 can directly add the newly scanned document data to the groupware document data that has once been stored in the groupware server 20, thereby making it possible to easily edit the electronic document data.

The functional block diagram of the groupware server 20 and the image forming apparatus 30 is the same as that shown in FIG. 3, and a description thereof will be omitted.

Figure 14:
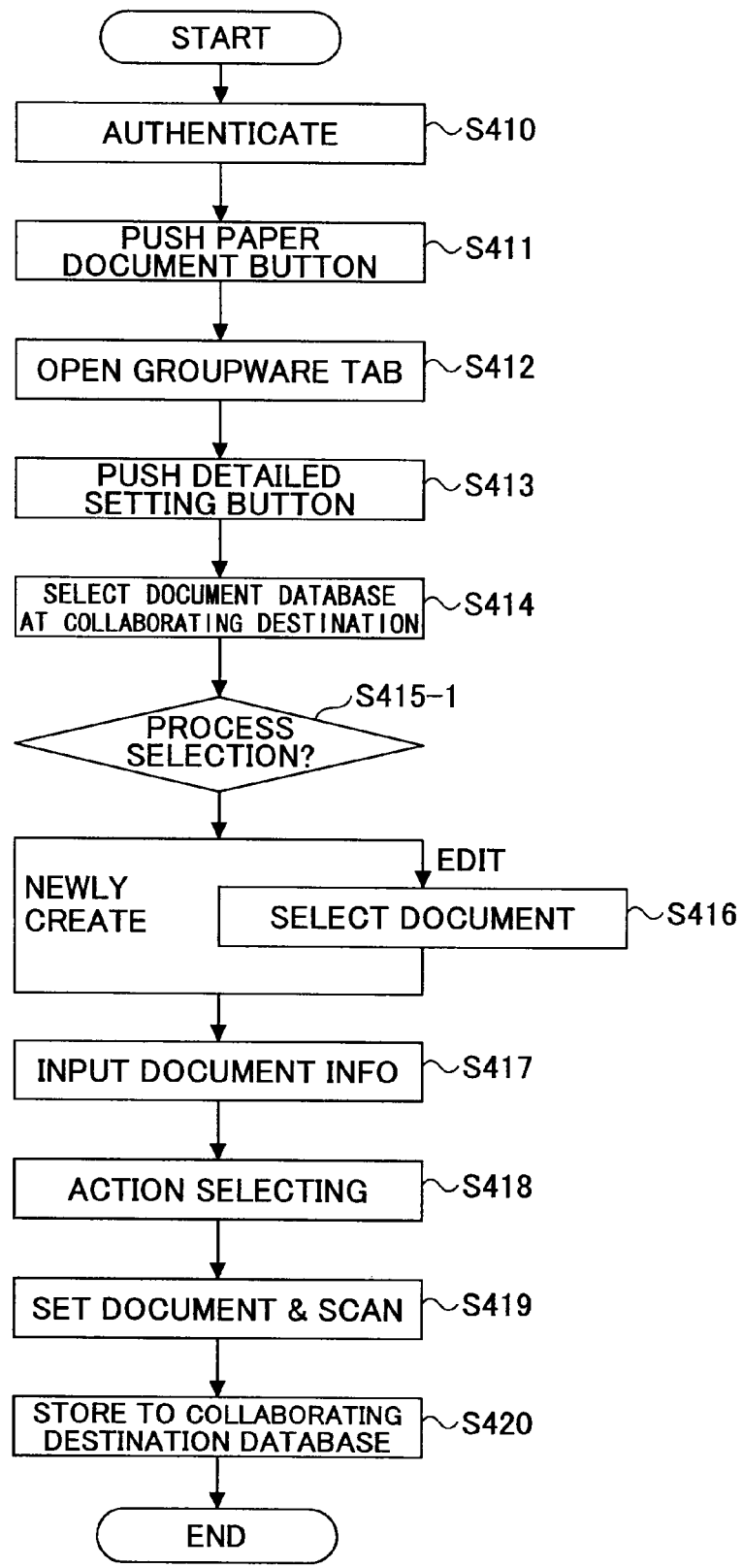
FIG. 14 is a flow chart for explaining a process carried out in the image forming system of the third embodiment.

Next, a description will be given of the process of this embodiment, by referring to the flow chart shown in FIG. 14 and the screen transition diagrams of the operation panel 303 shown in FIGS. 5 through 9, 15 and 16. FIG. 14 is a flow chart for explaining a process carried out in the image forming system 10 of the third embodiment. In FIG. 14, those steps that are the same as those corresponding steps in FIG. 4 are designated by the same reference numerals, and a description thereof will be omitted. In addition, a description of the screen transition diagrams of the operation panel 303 shown in FIGS. 5 through 9 will be omitted.

In FIG. 14, when the database at the collaborating destination of the image forming apparatus 30 is selected in the step S414, the image forming apparatus 30 urges the user to select a process of storing the paper document that is newly scanned in the database as a new groupware document data file or, a process of editing the an existing groupware document database file within the database in a step S415-1. The process advances to the step S416 if the process of editing is selected in the step S415-1.

Figure 15:
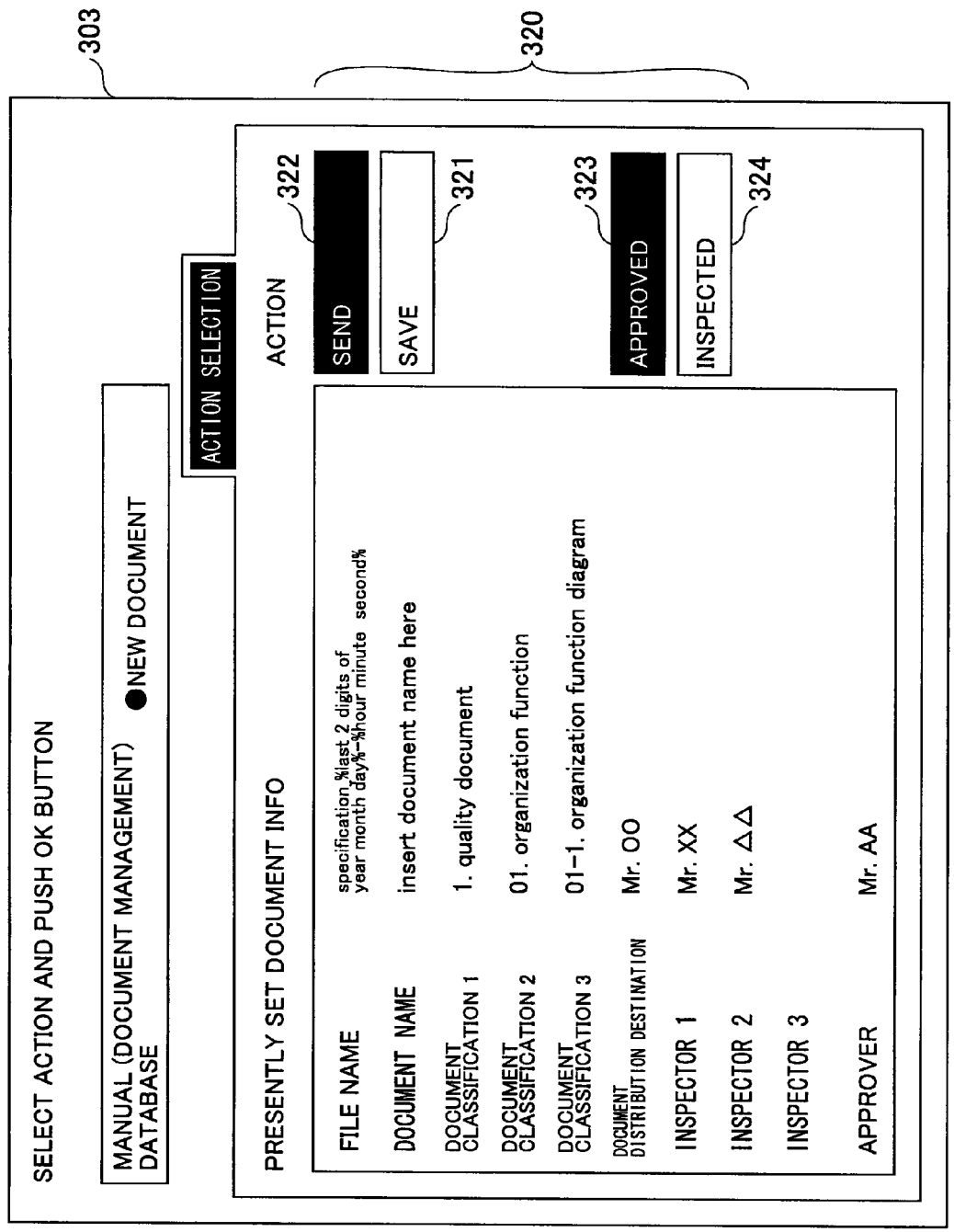
FIG. 15 is a diagram showing an action selection screen displayed on the operation panel.

FIG. 15 is a diagram showing an action selection screen displayed on the operation panel 303. In FIG. 15, those parts that are the same as those corresponding parts in FIG. 10 are designated by the same reference numerals, and a description thereof will be omitted.

In this embodiment, the action buttons 320 include the save button 321 that instructs a save process to save the document data, the send button 322 that instructs a send process to send the document data, an approved button 323 that instructs a stamp process to put an electronic stamp that indicates that the document data file has been approved, and an inspected (or examined) button 324 that instructs a stamp process to put an electronic stamp that indicates that the document data file has been inspected (or examined). If the user selects the save button 321 (S418 in FIG. 14), for example, the control part 308 executes the save process to store the document data having the attribute information 211A in the manual document database 220.

Next, a description will be given of a case where the process of editing the existing document database file within the database is selected in the step S415-1 shown in FIG. 14. In this case, it is assumed for the sake of convenience that the attribute information of the groupware document data is changed, and further, new document data is added. When an "existing document" button is pushed on the screen shown in FIG. 8, the image forming apparatus 30 acquires a list of existing document data files stored within the manual document database 220.

The control part 308 sends an acquisition request for the list of the document data files to the groupware server 20 via the communication part 304. In the groupware server 20, the control part 251 receives the acquisition request for the list of the document data files, and acquires a list 318 of the document data files stored in the manual document database 20. The groupware server 20 sends this list 318 to the image forming apparatus 30 via the communication part 252.

Figure 16:
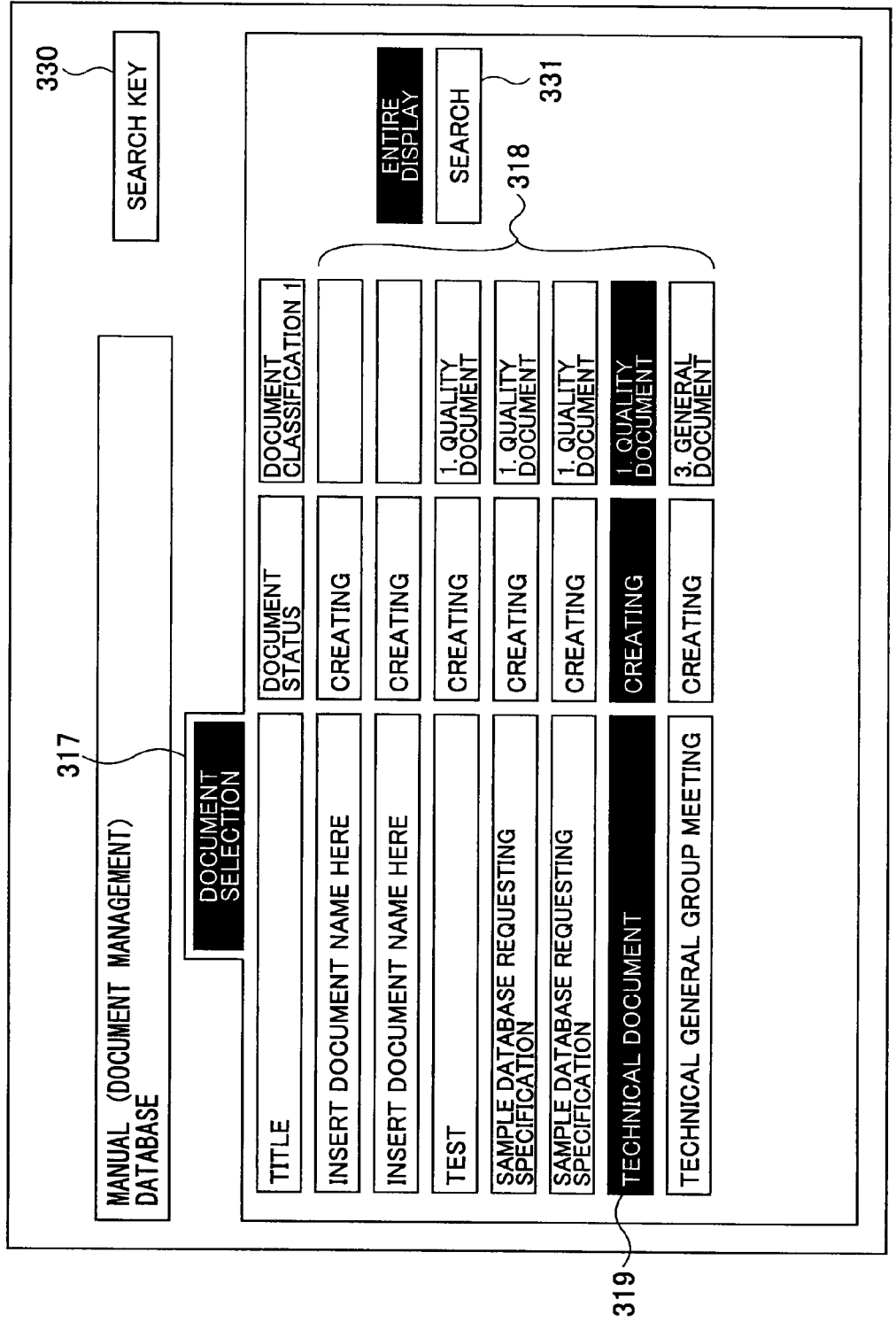
FIG. 16 is a diagram showing a list of document data files displayed on the operation panel.

When the control part 308 acquires the list 318 of the document data files, the control part 308 displays this list 318 of the document data files on the operation panel 303 in a selectable manner. FIG. 16 is a diagram showing the list 318 of the document data files displayed on the operation panel 303. The user selects the document data file to which the document data that is obtained by the scan is to be added, from the list 318 of the document data files displayed on the operation panel 303 (S416). In this embodiment, it is assumed for the sake of convenience that a technical document file 319 is selected from the list 318 as the document data file.

When selecting the groupware document data file in the image forming apparatus, it is possible to search the desired groupware document data from the list 318 that is displayed on the operation panel 303. As shown in FIG. 16, for example, a search key input region 330 for inputting the search key may be displayed on the operation panel 303. When the user inputs the search keyword or the like to the search key input region 330 and pushes a search button 331, an instruction to carry out a search process is input to the image forming apparatus 30. In response to this instruction to carry out the search process, the image forming apparatus 30 searches the desired groupware document data file from the list 318 that is displayed on the operation panel 303 based on the search key. The search key used for this search may be a search keyword, the date, the file name or the like.

The image forming apparatus 30 may limit the number of groupware document data files displayed on the list 318. For example, in a case where 1000 groupware document data files are stored in the manual document database 220, it is possible to limit the number of groupware document data files in the list 318 that is displayed on the operation panel 303 to 500. In this case, the search process using the search button 331 is carried out with respect to the 500 groupware document data files on the list 318. By limiting the number of groupware document data files in the list that is displayed on the operation panel 303, it is possible to prevent the time required for the search process from becoming extremely long.

When the document data file is selected, the control part 308 sends to the groupware server 20 the acquisition request for the document information that has been set and is included in the attribute information of the selected document data file. In other words, the acquisition request for the document information that has been set and is included in the attribute information of the selected technical document file 319 is sent to the groupware server 20 in this embodiment. The control part 251 of the groupware server 20 receives the acquisition request from the control part 308, and acquires the document information requested thereby. A description will now be given of the process of acquiring the requested document information.

The attribute information of the groupware document data file includes identification information that is unique to and can identify the groupware document data file. When the control part 251 receives the acquisition request for the document information that has been set and is included in the attribute information of the selected document file, the control part 251 makes an access to the attribute database 210 using the identification information included in the attribute information, and refers to the attribute information of the collaborating destination database that is selected in the step S414 and collaborates with the image forming apparatus 30.

In this embodiment, the control part 251 refers to the attribute information 211 of the manual document database 220. Next, the control part 251 makes access to the manual document database 220 based on the setting information of the manual document database 220 included in the attribute information 211. Then, the control part 251 acquires the document information from the attribute information of the technical document file 319 which is the selected document data file. The control part 251 sends the acquired document information to the image forming apparatus 30 via the communication part 252.

When the image forming apparatus 30 acquires the document information sent from the groupware server 20, the control part 308 displays the acquired document information on the operation panel 303. FIG. 16 is a diagram showing the document information that is acquired by the image forming apparatus 30 and displayed. The document information that is displayed in this case is the document information that has been set when storing the technical document file 319 in the manual document database 220 as the new groupware document data. In other words, the document information of the technical document file 319 is displayed on the input screen shown in FIG. 9 in a state where the information that has already been set is input.

In the step S417, the user may change the document information displayed on the input screen. A description will now be given of how the document information included in the attribute information is changed.

FIG. 17 is a diagram showing the document information that is acquired by the image forming apparatus 30 and displayed. In the image forming apparatus 30, he contents of the document information shown in FIG. 17 that is displayed on the operation panel 303 may be changed by operating the software keyboard or the like that is simultaneously displayed on the operation panel 303. In this embodiment, the image forming apparatus 30 can change the contents that are set for each item of the document information.

In the case shown in FIG. 17, for example, the changeable items are the file name, the document name, the document classification and the like that are set. For example, the file name and the document name may be changed by operating the alphanumeric software keyboard that is displayed on the operation panel. In the case of the item such as the document classification, the input format may be the pull-down format which enables the desired classification to be selected. In such a case, the user may select the desired classification by utilizing the pointer function or the like provided by the operation panel 303.

Therefore, according to the image forming apparatus 30 of this embodiment, it is possible to change the document information included in the attribute information.

Figure 18:
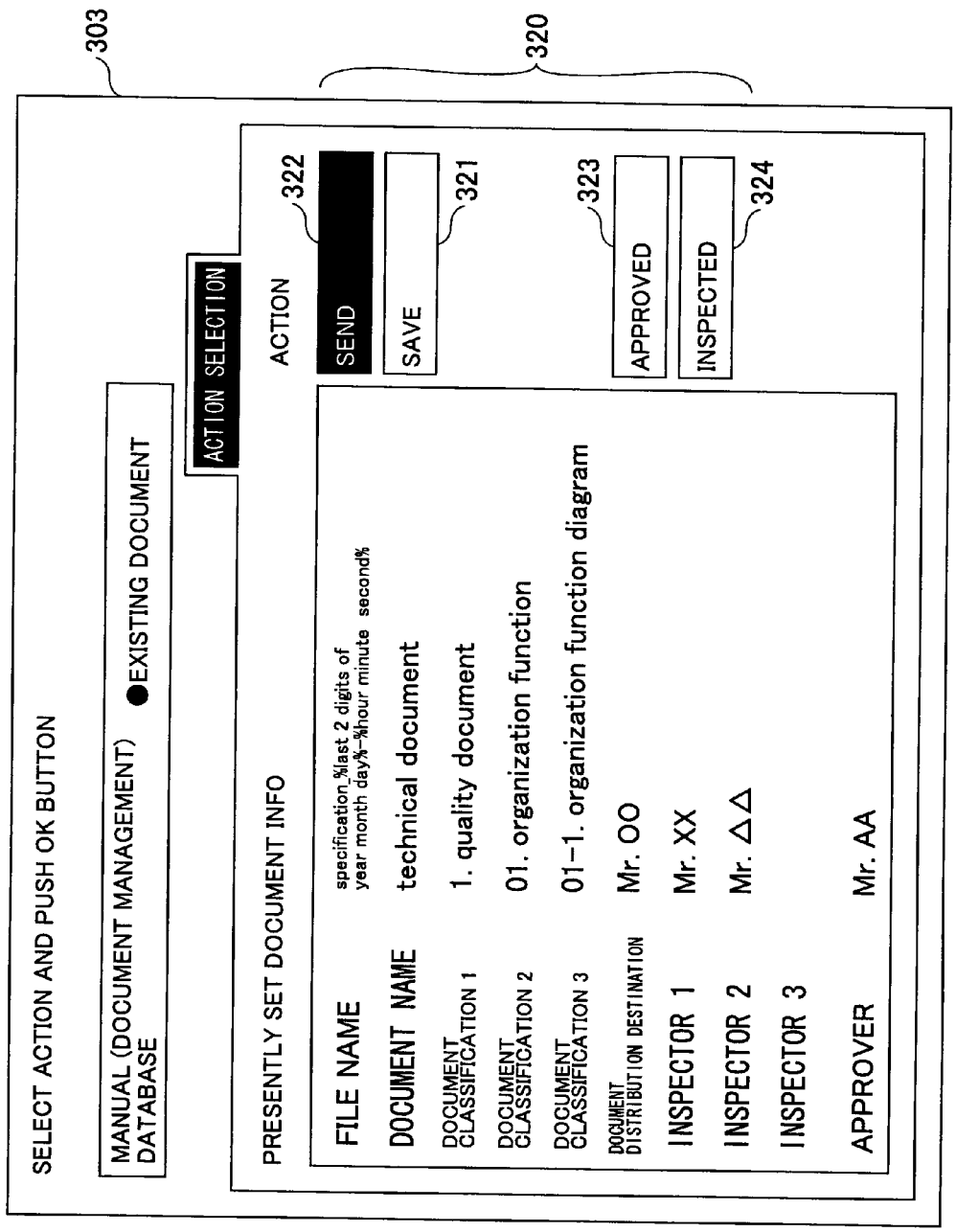
FIG. 18 is a diagram for explaining the action selection of the third embodiment.

Next, a description will be given of the action selection in the step S418 shown in FIG. 14, by referring to FIG. 18. FIG. 18 is a diagram for explaining the action selection of this embodiment. In FIG. 18, those parts that are the same as those corresponding parts in FIG. 15 are designated by the same reference numerals, and a description thereof will be omitted.

In the image forming apparatus 30, if the technical document data file 319 is read and inspected by an inspector I1, for example, and the inspector I1 pushes the inspected button 324. In response to this pushing of the inspected button 324, the control part 308 carries out the stamp process to put the electronic stamp that indicates that the document data file has been inspected, with respect to the technical document data file 319. When the inspector I1 pushes the save button 321 after this stamp process ends, the control part 308 sends the technical document data file 319 to the groupware server 20 via the communication part 304.

Similarly, in the image forming apparatus 30, if the technical document data file 319 is read and approved by an approver A1, for example, and the approver A1 pushes the approved button 323. In response to this pushing of the approved button 323, the control part 308 carries out the stamp process to put the electronic stamp that indicates that the document data file has been approved, with respect to the technical document data file 319. When the approver A1 pushes the save button 321 after this stamp process ends, the control part 308 sends the technical document data file 319 to the groupware server 20 via the communication part 304.

When the control part 251 of the groupware server 20 receives the technical document data file 319 that has been edited, the control part 251 traces the location where the technical document data file 319 prior to the editing was stored, based on the identification information included in the attribute information of the technical document data file 319. The write part 253 overwrites the edited technical document data file 319 at the location where the technical document data file 319 prior to the editing was stored. In this embodiment, the edited technical document data file 319 is stored within the manual document database 220.

Therefore, according to this embodiment, it is possible to directly change and update the state of an arbitrary existing document data file that is stored within the groupware server 20, from the image forming apparatus 30.

Next, a description will be given of the scan of the paper document in the step S419 shown in FIG. 14.

In this embodiment, after each setting and/or editing have been completed with respect to the document data that is to be obtained, the user sets the paper document on the scan part 302 of the image forming apparatus 30.

When the paper document is scanned by the scan part 302, the control part 308 adds the document data that is newly obtained by the scan to the technical document data file 319. The changed attribute information is added to a technical document data file 319A that has been added with the new document data, and the technical document data file 319A with the changed attribute information is overwritten to the manual document database 220 as the edited or updated groupware document data file. As described above, this overwrite process is carried out by the control part 251 of the groupware server 20. More particularly, the control part 251 traces the identification information included in the changed attribute information, and determines the location where the edited groupware document data file is to be overwritten. The image forming apparatus 30 may print the edited groupware document data file before the edited groupware document data file is stored.

It is assumed in this embodiment that the groupware document data file that is read by the image forming apparatus 30 includes the document data and the attribute information, however, the groupware document data file is not limited to such. For example, it is possible to first set the attribute information in the image forming apparatus 30, and then store only the set attribute information in the document database of the groupware server 20. In this case, the stored attribute information may be later read, and added to the document data by an editing process.

Therefore, according to this embodiment, the image forming apparatus 30 can carry out the editing process that changes the attribute information of the arbitrary existing groupware document data file stored within the groupware server 20, and adds new document data to the arbitrary existing groupware document data file.

The image forming apparatus 30 of this embodiment may record log information related to the processes carried out by the image forming apparatus 30. The log information may be collected by the control part 308, and may be stored in a storage part or means (not shown) within the image forming apparatus 30. For example, the log information includes the name of the collaborating destination database that has been accessed, the file name of the file that has been processed, the document name of the document that has been processed, the type of process carried out in the image forming apparatus, the name of the storing destination database, the results of processes, and the like. The log information may be stored in the image forming apparatus 30 up to a preset amount, for example, and when the preset amount is exceeded, the log information may be recovered by the groupware server 20.

A computer-readable image forming program or database management program may cause a computer to carry out procedures for realizing the functions of each of the embodiments described above, and such an image forming program or database management program may be stored in a computer-readable storage medium.

FIG. 19 is a diagram for explaining the computer-readable storage medium that stores the database management program. A database management program 400 stored in a computer-readable storage medium 410 is read by and executed by a computer 500, so as to realize the functions of each of the embodiments described above.

The computer 500 shown in FIG. 19 includes a CPU 510, a hard disk drive 520, a memory 530, a display part 540, an input part 550, a communication part 560, and a storage medium read part 570 that are connected via a bus 600. The CPU 510 carries out the operations and processes of the computer 500 by executing programs and applications. The hard disk drive 520 forms a storage part or means, and stores applications that operate on the computer 500 and various data including the data created by the applications. The memory 530 stores various setting values of the computer 500, operation results of the CPU 510 and the like.

The display part 540 is formed by a display for displaying the data created by the computer 500 and the like in a manner inspectable by the user. The input part 550 is formed by a keyboard and/or a mouse, that is operated by the user to input various data and instructions. The communication part 560 is formed by a network control unit or the like for enabling the computer 500 to communicate with an external apparatus. The storage medium read part 570 is formed by a floppy disk (registered trademark) drive or the like for reading data and programs recorded on various storage media including the floppy disk. The database management program 400 may be received by the communication part 560 via a network or, may be recorded in a storage medium such as the hard disk within the hard disk drive 520.

Of course, it is possible to appropriately combine two or more embodiments described above if necessary to achieve the desired purpose.

This application claims the benefit of Japanese Patent Applications No. 2006-134158 filed May 12, 2006 and No. 2006-284315 filed Oct. 18, 2006, in the Japanese Patent Office, the disclosures of which are hereby incorporated by reference.

Further, the present invention is not limited to these embodiments, but various variations and modifications may be made without departing from the scope of the present invention.

What is claimed is:

1. An image forming system comprising:
   an image forming apparatus configured to function as a groupware terminal; and
   a groupware server of a groupware,
   said groupware server comprising:
      plural document databases configured to store document data; and
      an attribute database configured to store multiple lists of different plural kinds of attribute information, each kind of the attribute information being setting items unique to each document database, the setting items being required to be set when storing the document data in the document database,
   said image forming apparatus comprising:
      a scan part configured to scan a paper document and to obtain document data;
      a first display screen that displays a selection screen enabling selection of one of the plural document databases;
      an acquiring part configured to acquire one of the lists of attribute information from the attribute database corresponding to the selected document database;
      a second display screen that displays an input screen to set the unique predetermined setting items included in the acquired list of attribute information;
      a setting part configured to add the attribute information including the set setting items to the document data obtained by the scan part; and
      a sending part configured to send to the groupware server the document data having the added attribute information,
      said groupware server storing the document data having the added attribute information including the set setting items, received from the sending part, in the document database.

2. The image forming system as claimed in claim 1, wherein:
   said first display screen of said input image forming apparatus is further configured to display a list of the attribute information stored in the attribute database, and to enable selection of the certain attribute information to be referred to from the list in response to an input.

3. The image forming system as claimed in claim 2, wherein said image forming apparatus has a browser function for providing access to the groupware server, and said selecting screen displays the list of the attribute information stored in the attribute database by the browser function.

4. The image forming system as claimed in claim 1, wherein the attribute information further includes environment information of the groupware, setting information of the respective document database to which the document data is stored, and document information related to the document data stored in the document database.

5. The image forming system as claimed in claim 1, wherein said image forming apparatus comprises:
   a reading part configured to read the document data and the corresponding attribute information stored in the document database; and
   a changing part configured to change the attribute information read by the reading part,
   wherein said groupware server stores the document data read by the reading part and the attribute information changed by the changing part in the document database.

6. The image forming system as claimed in claim 5, wherein:
   said changing part adds the document data obtained by the scan part to the document data read by the reading part; and
   said groupware server stores the document data read by the reading part and added with the document data obtained by the scan part by the changing part, and the attribute information changed by the changing part in the document database.

7. The image forming system as claimed in claim 1, wherein:
   said first display screen of said image forming apparatus is further configured to display a list of the document data stored in the selected document database in response to an input, and to display a search part enabling searching of a document data from the list based on a search key.

8. The image forming system as claimed in claim 1, wherein:
   said groupware server comprises a user information database configured to store user information that is used to log-in to the groupware,
   said image forming apparatus comprises a storage medium read part configured to read information from a storage medium recorded with the user information, and said groupware server authenticates the user information when user information matching the user information read by the storage medium read part exists in the user information database.

9. A groupware server of a groupware which is connectable, via a network, to an image forming apparatus that functions as a groupware terminal, said groupware server comprising:
   a communicating part configured to communicate with the image forming apparatus via the network;
   plural document databases configured to store document data;
   an attribute database configured to store multiple lists of different plural kinds of attribute information, each kind of the attribute information being setting items unique to each document database, the setting items being required to be set when storing the document data in the document database; and
   a write part configured to write the document data and the attribute information to said at least one document database,
   wherein:
      said communicating part sends a certain one of the list of attribute information to the image forming apparatus in response to an acquisition request for the certain list of attribute information received from the image forming apparatus, the image forming apparatus including a display screen that displays an input screen to set the unique predetermined setting item based on the information related to the format included in the document database, and
      said write part writes the document data in said at least one document database in response to a write request for the document data having the certain list of attribute information added to the document data, received by said communicating part from the image forming apparatus.

10. The groupware server as claimed in claim 9, wherein
   said communicating part sends to the image forming apparatus a list of the attribute information in response to an acquisition request for the attribute information received from the image forming apparatus.

11. The groupware server as claimed in claim 9, wherein the attribute information further includes environment information of the groupware, setting information of the respective document database to which the document data is stored, and document information related to the document data stored in the document database.

12. The groupware server as claimed in claim 9, wherein said write part overwrites changed attribute information to the document database when said communication part receives a write request for the changed attribute information corresponding to a changed document data from the image forming apparatus.

13. The groupware server as claimed in claim 12, wherein said write part overwrites a document data that is added with a new document data to the document database when said communication part receives a write request for the document data that is added with the new document from the image forming apparatus.

14. The groupware server as claimed in claim 9, further comprising:
   a user information database configured to store user information that is used to log-in to the groupware, wherein said image forming apparatus comprises a storage medium read part configured to read information from a storage medium recorded with the user information, and
   said groupware server authenticates the user information when user information matching the user information read by the storage medium read part exists in the user information database.

15. An image forming apparatus configured to function as a groupware terminal and connectable to a groupware server of a groupware, said groupware server comprising plural document databases configured to store document data, and an attribute database configured to store multiple lists of different plural kinds of attribute information, each kind of the attribute information being setting items unique to each document database, the setting items being required to be set when storing the document data in the document database,
   said image forming apparatus comprising:
      a scan part configured to scan a paper document and to obtain document data;
      a first display screen that displays a selection screen enabling selection of one of the plural document databases;
      an acquiring part configured to acquire one of the lists of attribute information from the attribute database corresponding to the selected document database;
      a second display screen that displays an input screen to set the unique predetermined setting items included in the acquired attribute information;
      a setting part configured to add the attribute information including the set setting items to the document data obtained by the scan part; and
      a sending part configured to send to the groupware server the document data having the set attribute information, so that said groupware server stores the document data having the added attribute information including the set setting items, in the document database,
   wherein:
      the document data having the added attribute information including the set setting item sent from the image forming apparatus is stored in the document database of the groupware server.

16. The image forming apparatus as claimed in claim 15, wherein:
   said display screen of said image forming apparatus is further configured to display a list of the attribute information stored in the attribute database, and to enable selection of the certain attribute information to be referred to from the list in response to an input.

17. The image forming apparatus as claimed in claim 16, wherein said image forming apparatus has a browser function for providing access to the groupware server, and said selecting screen displays the list of the attribute information stored in the attribute database by the browser function.

18. The image forming apparatus as claimed in claim 15, wherein the attribute information further includes environment information of the groupware, setting information of the respective document database to which the document data is stored, and document information related to the document data stored in the document database.

19. The image forming apparatus as claimed in claim 15, further comprising:
   a reading part configured to read the document data and the corresponding attribute information stored in the document database; and
   a changing part configured to change the attribute information read by the reading part, so that said groupware server stores the document data read by the reading part and the attribute information changed by the changing part in the document database.

20. The image forming apparatus as claimed in claim 19, wherein said changing part adds the document data obtained by the scan part to the document data read by the reading part, so that said groupware server stores the document data read by the reading part and added with the document data obtained by the scan part by the changing part, and the attribute information changed by the changing part in the document database.

21. The image forming apparatus as claimed in claim 15, wherein:
said first display screen of said image forming apparatus is further configured to display a list of the document data stored in the selected document database in response to an input, and to display a search part enabling searching of a document data from the list based on a search key.

22. The image forming apparatus as claimed in claim 15, wherein:
said groupware server comprises a user information database configured to store user information that is used to log-in to the groupware,
said image forming apparatus further comprises a storage medium read part configured to read information from a storage medium recorded with the user information, and
said groupware server authenticates the user information when user information matching the user information read by the storage medium read part exists in the user information database.

23. A non-transitory computer-readable storage medium which stores a database management program for causing a computer to function as a groupware server of a groupware which is connectable, via a network, to an image forming apparatus that functions as a groupware terminal, said groupware server comprising plural document databases configured to store document data, and an attribute database configured to store multiple lists of different plural kinds of attribute information, each kind of the attribute information being setting items unique to each document database, the setting items being required to be set when storing the document data in the document database which when executed by the computer, causes the computer to perform a method comprising:
communicating with the image forming apparatus via the network; and
writing the document data and the attribute information to said at least one document database,
wherein:
said communicating causes the computer to send a certain one of the list of attribute information from the attribute database to the image forming apparatus in response to an acquisition request for the certain list of attribute information received from the image forming apparatus, the image forming apparatus including a display screen that displays an input screen to set the unique predetermined setting item based on the information related to the format included in the document database, and
said writing causes the computer to write the document data in said at least one document database in response to a write request for the document data having the certain list of attribute information set with the predetermined setting item added to the document data, received by said communicating from the image forming apparatus.

24. The non-transitory computer-readable storage medium according to claim 23, wherein
said groupware server comprises a user information database configured to store user information that is used to log-in to the groupware,
said image forming apparatus comprises a storage medium read part configured to read information from a storage medium recorded with the user information, and
said groupware server authenticates the user information when user information matching the user information read by the storage medium read part exists in the user information database.

* * * * *